US008797951B2

(12) United States Patent
Awano

(10) Patent No.: US 8,797,951 B2
(45) Date of Patent: Aug. 5, 2014

(54) COMMUNICATION SYSTEM, TRANSFER NODE, MOBILE NODE, SERVER APPARATUS, COMMUNICATION CONTROL METHOD, AND PROGRAM

(75) Inventor: Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 636 days.

(21) Appl. No.: 12/919,545

(22) PCT Filed: Mar. 10, 2009

(86) PCT No.: PCT/JP2009/054501
§ 371 (c)(1),
(2), (4) Date: Aug. 26, 2010

(87) PCT Pub. No.: WO2009/113517
PCT Pub. Date: Sep. 17, 2009

(65) Prior Publication Data
US 2011/0007691 A1   Jan. 13, 2011

(30) Foreign Application Priority Data

Mar. 10, 2008   (JP) .................................. 2008-059488

(51) Int. Cl.
*H04W 4/00*   (2009.01)
(52) U.S. Cl.
USPC ........................................................ 370/328
(58) Field of Classification Search
USPC ........................................................ 370/328
See application file for complete search history.

(56) References Cited

U.S. PATENT DOCUMENTS

| 6,987,771 | B2 * | 1/2006 | Shimizu et al. | 370/401 |
| 8,054,780 | B1 * | 11/2011 | Manroa et al. | 370/328 |
| 2002/0009066 | A1 | 1/2002 | Shimizu et al. | |
| 2003/0088765 | A1 * | 5/2003 | Eschbach et al. | 713/150 |
| 2003/0235168 | A1 | 12/2003 | Sharma et al. | |

(Continued)

FOREIGN PATENT DOCUMENTS

| CN | 1659910 A | 8/2005 |
| CN | 1666190 A | 9/2005 |

(Continued)

OTHER PUBLICATIONS

International Search Report for PCT/JP2009/054501 mailed Jun. 23, 2009.

(Continued)

Primary Examiner — Mark Rinehart
Assistant Examiner — Maharishi Khirodhar
(74) Attorney, Agent, or Firm — Sughrue Mion, PLLC

(57) ABSTRACT

A communication system includes transfer node 200 receiving a registration request signal from mobile node 100 and server 300 receiving the registration request signal from transfer node 200. Transfer node 200 determines, depending on the type of a transmission trigger for the registration request signal occurred, whether or not the number of mobile nodes which will be registered or which will have registration expiry time postponed are a plurality. If the plurality of mobile nodes are not to be processed, transfer node 200 transmits a registration request signal for one mobile node to server 300. If the plurality of mobile nodes are to be processed, transfer node 200 transmits an aggregation registration request signal concerning the plurality of mobile nodes, to server 300. Server 300 executes a process of registering or postponing the mobile node or the plurality of mobile nodes according to signal received from transfer node 200.

17 Claims, 15 Drawing Sheets

(56) References Cited

U.S. PATENT DOCUMENTS

| | | |
|---|---|---|
| 2004/0029584 A1 | 2/2004 | Le et al. |
| 2004/0047348 A1* | 3/2004 | O'Neill ............... 370/389 |
| 2006/0153120 A1* | 7/2006 | Channasamudhram ...... 370/328 |
| 2009/0080387 A1* | 3/2009 | Dell'Uomo et al. .......... 370/338 |

FOREIGN PATENT DOCUMENTS

| | | |
|---|---|---|
| JP | 2001-339438 A | 12/2001 |
| JP | 2003235065 A | 8/2003 |
| JP | 2003244206 A | 8/2003 |
| JP | 2003534719 A | 11/2003 |
| JP | 2004241895 A | 8/2004 |
| JP | 2005-532012 A | 10/2005 |
| JP | 2007097073 A | 4/2007 |
| JP | 3972880 B | 9/2007 |
| JP | 2007251477 A | 9/2007 |
| WO | 2007047145 A | 4/2007 |

OTHER PUBLICATIONS

C. Perkins Ed., "IP Mobility Support for IPv4", Network Working Group, RFC3344, Aug. 2002.
K. Leung et al., "WiMAX Forum/3GPP2 Proxy Mobile IPv4". MIP4, Sep. 20, 2007.
K. Leung et al., "Proxy Mobile IPv6", NETLMM WG, Nov. 4, 2007.
Chinese Office Action for CN200980107206.1 dated Aug. 31, 2012.
Japanese Office Action for JP Application No. 2010-502816 mailed on Apr. 23, 2013 with Partial English Translation.

* cited by examiner

| No | administration server identifier | aggregation registration request processing capability |
|----|----------------------------------|--------------------------------------------------------|
| 1  | HA_Addr1                         | ○                                                      |
| 2  | HA_Addr2                         | ○                                                      |
| 3  | HA_Addr3                         | ×                                                      |
| ⋮  | ⋮                                | ⋮                                                      |

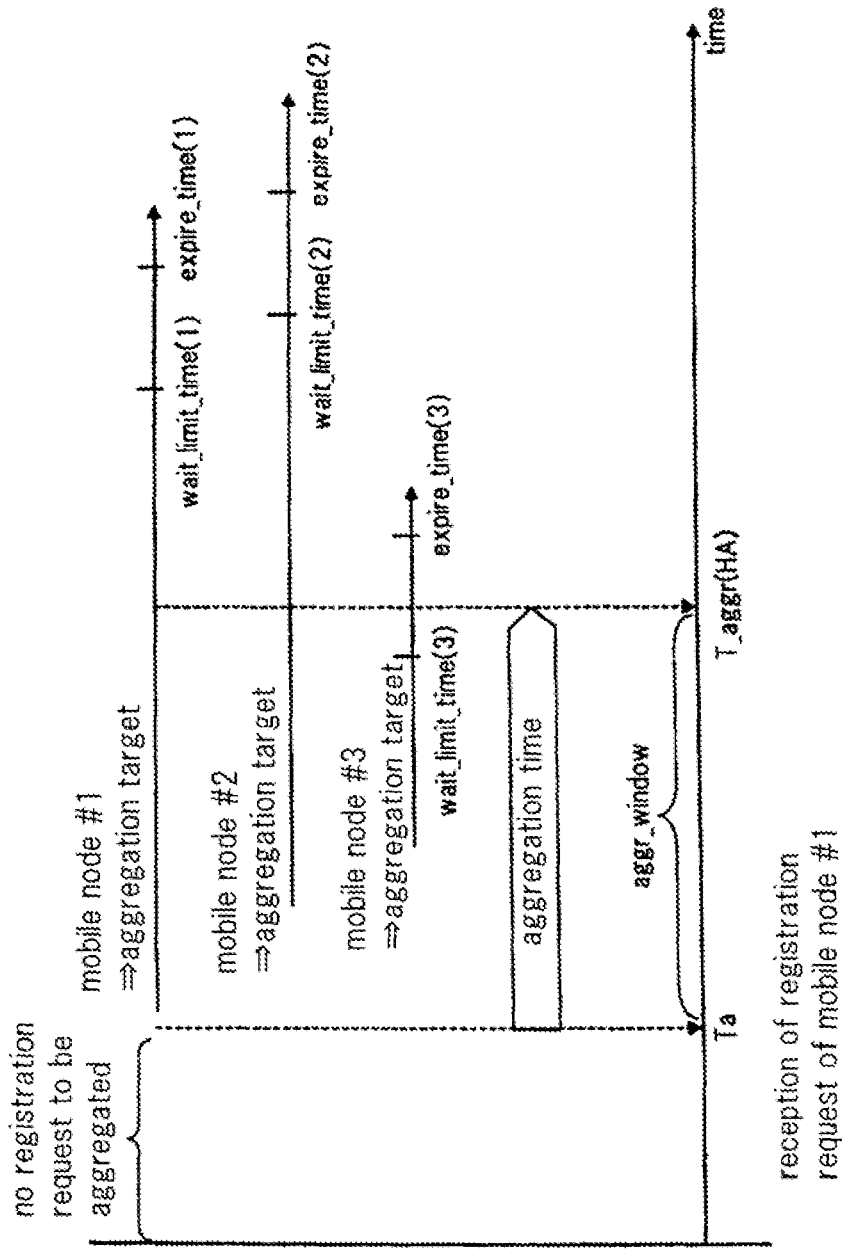

Fig.8

| transmission time | administration server | common information | the number of signals aggregated | individual information |
|---|---|---|---|---|
| T_aggr (1) | HA_addr1 | COMMON_INFO#1 ={CoA, etc.} | 3 | MN_INDIVIDUAL_INFO#1 ={HoA, NAI, Lifetime, authentication information, etc.} |
| | | | | MN_INDIVIDUAL_INFO#2 |
| | | | | MN_INDIVIDUAL_INFO#3 |
| | HA_addr2 | COMMON_INFO#2 | 2 | MN_INDIVIDUAL_INFO#4 |
| | | | | MN_INDIVIDUAL_INFO#5 |
| T_aggr (2) | HA_addr3 | COMMON_INFO#3 | 2 | MN_INDIVIDUAL_INFO#6 |
| | | | | MN_INDIVIDUAL_INFO#7 |

COMMUNICATION SYSTEM, TRANSFER NODE, MOBILE NODE, SERVER APPARATUS, COMMUNICATION CONTROL METHOD, AND PROGRAM

This application is the National Phase of PCT/JP2009/054501 filed Mar. 10, 2009, which is based upon and claims the benefit of priority from Japanese Patent Application No, 2008-059488 filed on Mar. 10, 2008, the content of which is incorporated by reference.

TECHNICAL FIELD

The present invention relates to a communication system configured to realize mobile communication by registering, in an administration server, an address fixedly used by a mobile node and an address dependent on a network to which the mobile node migrates, a transfer node, the mobile node, and a server apparatus used in the system, a communication control method, and a program for allowing a computer to execute the method.

BACKGROUND ART

An exemplary method for realizing mobile communication is MIP (Mobile Internet Protocol) described in RFC3344. The RFC3344 is introduced in "IP Mobility support for IPv4", RFC3344, August 2002, Network Working Group, URL: http://www.ietf.org/rfc/rfc3344 (browsed on Jan. 17, 2008).

In the MIP, an MN (Mobile Node) that is a mobile node transmits a registration request signal for association of a CoA (Care-of Address) that is an address acquired from a connection destination network with an HoA (Home Address) fixedly assigned to the MN regardless of the network to which the MN is connected, to an HA (Home Agent) that is an administration server, at the time of a network connection and network migration as well as after a predetermined time.

In accordance with the registration request signal, the HA holds the correspondence relationship between the HoA and CoA and receives, by proxy, traffic destined for the HoA by the MN. The HA encapsulates the traffic and then transfers the encapsulated traffic to the CoA. Thus, even after migration, the MN can continue to receive packets transmitted to the HoA by the MN, achieving mobile communication.

Here, in connection with the use of the CoA, the RFC3344 specifies two types of methods, that is, a method utilizing the CoA assigned to the MN itself (Co-located CoA mode) and a method in which the CoA held by an FA (Foreign Agent) that is a transfer node is shared by a plurality of MNs (FA mode). In the FA mode, the registration request signal transmitted by the MN is transmitted to the HA via the FA. A registration reply signal that is a reply to the registration request signal is also transmitted to the MN via the FA.

The IETF (Internet Engineering Task Force) is now examining a similar technique based on a protocol called a proxy mobile IP (PMIP). In this technique, a node called a PMIP client or a MAG (Mobile Access Gateway) transmits the registration request signal to a node serving as an HA, instead of a mobile node that has migrated into an area covered by the PMIP client or the MAG.

The PMIP is introduced in "WiMax Forum/3GPP2 Proxy Mobile IPv4", Sep. 20, 2007, URL:http://tools.ietforg/html/draft-leung-mip4-proxy-mode-4 (browsed on Jan. 17, 2008) and "Proxy Mobile IPv6", Nov. 4, 2007, NETLMM WG, URL:http://toolsietforg/html/draft-letf-netlmm-proxymip6-07 (browsed on Jan. 17, 2008).

DISCLOSURE OF THE INVENTION

The mobile communication system such as the MIP or PMIP has been described in which the mobile node transmits the registration request signal to the administration server to register the correspondence relationship between the HoA and the CoA in the administration server, thus enabling mobile communication. In the system, as described above, the mobile node, PMIP client, or MAG needs to transmit the registration request signal to the administration server upon being triggered by a network connection, network migration, and the elapse of a predetermined time after registration; when the predetermined time elapses after'registration, the registration request signal is transmitted to prevent expiry of the registration.

However, when a mobile communication system configured to enable mobile communication using the above-described mechanism is applied to a large-scale system such as a mobile telephone network, an enormous number of mobile nodes needs to be administered. Moreover, since the mobile node transmits the registration request signal to the administration server at such a number of triggers as described above, the administration server is disadvantageously subjected to a very heavy load associated with processing of the registration request signal and the registration reply signal.

A solution to this is a method of aggregating signals to be transmitted before transmission. The method is commonly used in many fields such as radio communication in which improvement of band efficiency is important. The aggregation of signals allows overlapping information among individual signals to be omitted, and enables a reduction in the number of signals to be processed. This is because since the signal reception and transmission process often involves various processing modules, even if the aggregation fails to contribute to reducing data size, the processing load can be reduced simply by decreasing the number of signals. The method is thus expected to improve transmission efficiency and to reduce the load on the node configured to process the signals.

The aggregation of signals is an effective method. However, for example, when received signals to be transferred are aggregated, the signals are not transferred during the aggregation. This disadvantageously increases latency lasting until replies to the signals are obtained. When the method of signal aggregation is applied to the above-described MIP or PMIP, an increase in the latency of the registration request signal associated with migration of the mobile node leads to a significant increase in packet loss. This may result in intolerable disruption of services.

JP3972880B (hereinafter referred to as Patent Document 1) describes a technique in which if a mobile node called an MR (Mobile Router) operates as a router, a registration request signal containing an aggregation of a plurality of addresses assigned to nodes connected to the MR is transmitted. However, as described above, the MR is a derivation of a mobile node. Thus, when the MR migrates to a different network, a registration signal containing an aggregation of addresses administered by the MR may be transmitted. Hence, the above-described latency problem does not originally occur.

The latency problem occurs when transmission triggers for the registration request signal occur randomly for each of a plurality of mobile nodes and during the MR aggregates registration request signals transmitted by a plurality of mobile nodes, the transmission of the registration request signals needs to be withheld. Therefore, this problem cannot be solved by the method described in Patent Document 1.

An exemplary object of the present invention is to provide a communication system, a transfer node, a mobile node, a server apparatus, a communication control method, and a program allowing a computer to execute the method in which processing loads on a server configured to administer addresses are reduced and in which the communication quality of the mobile node is inhibited from being degraded.

A communication system according to an exemplary aspect of the present invention includes a transfer node transmitting a registration request signal for requesting registration of an address of a mobile node and a server receiving the registration request signal from the transfer node, wherein when a transmission trigger for the registration request signal occurs, the transfer node determines the type of the transmission trigger, and depending on the determined type, determines whether or not the number of mobile nodes which will be registered or which will have a registration expiry time postponed are a plurality, in accordance with the registration request signal, wherein if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information, and wherein upon receiving the registration request signal from the transfer node, the server executes a process of registering the mobile node specified in the registration request signal or of postponing the registration expiry time for the mobile node, and upon receiving the aggregation registration request signal, the server executes a process of registering the specified plurality of mobile nodes or of postponing the registration expiry time for the specified plurality of mobile nodes.

Furthermore, a transfer node according to an exemplary aspect of the present invention, that transmits a registration request signal for requesting registration of an address of a mobile node, to a server administering the address, includes a storage section to save information contained in a transmission trigger for the registration request signal, and a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information.

Furthermore, a mobile node according to an exemplary aspect of the present invention, that is connected via a transfer node to a server administering an address, includes a storage section to store an address of the mobile node, and a control section that transmits a signal serving as a transmission trigger for the registration request signal and containing information indicating the type of a registration request signal for requesting registration of the address of the mobile node.

A server apparatus according to an exemplary aspect of the present invention, that receives a registration request signal for registration of an address of a mobile node from the transfer node, includes a storage section in which the address is registered, and a control section that upon receiving the registration request signal from the transfer node, executes a registration process of registering the address contained in the registration request signal, and upon receiving the aggregation registration request signal which includes a plurality of the registration request signals, executes the registration processes of registering the plurality of addresses contained in the aggregation registration request signal.

A communication control method according to an exemplary aspect of the present invention, by a transfer node transmitting a registration request signal for requesting registration of an address of a mobile node and a server receiving the registration request signal from the transfer node, includes: when a transmission trigger for the registration request signal occurs, the transfer node determines the type of the transmission trigger, depending on the determined type, the transfer node determines whether or not the number of mobile nodes which will be registered or which will have registration expiry time postponed are a plurality, in accordance with the registration request signal, and if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information, and wherein upon receiving the registration request signal from the transfer node, the server executes a process of registering the mobile node specified in the registration request signal or of postponing the registration expiry time, and upon receiving the aggregation registration request signal, the server executes a process of registering the specified plurality of mobile nodes or of postponing the registration expiry time for the specified plurality of mobile nodes.

Furthermore, a program according to an exemplary aspect of the present invention, that is executed by a computer transmitting a registration request signal for requesting registration of an address of a mobile node, to a server administering an address, allows the computer to execute processing such that when a transmission trigger for the registration request signal occurs, the computer determines the type of the transmission trigger, and depending on the determined type, determines whether or not the number of mobile nodes which will be registered or which will have registration expiry time postponed are a plurality, in accordance with the registration request signal, and such that if the plurality of mobile nodes are not to be processed, the computer generates and outputs a registration request signal intended for one mobile node, to the server, and if the plurality of mobile nodes are to be processed, the computer generates and transmits, to the server, a piece of information indicating that the plurality of mobile nodes will be processed, or a piece of information indicating the plurality of mobile nodes which will be processed, or an aggregation registration request signal with both pieces of information.

Moreover, a program according to an exemplary aspect of the present invention, that is executed by a computer receiving a registration request signal for requesting registration of an address of a mobile node, from a transfer node, allows the computer to execute processing such that upon receiving the registration request signal from the transfer node, the computer registers the address contained in the registration request signal, in a storage section, and upon receiving the aggregation registration request signal, the computer registers the plurality of addresses contained in the registration request signal.

BRIEF DESCRIPTION OF THE DRAWINGS

FIG. 7 is a diagram illustrating a method for determining whether or not to be able to aggregate registration request signals from a plurality of mobile nodes;

FIG. 8 is a diagram showing an example of an aggregation information table registered in an aggregation information storage section;

Figure 1:
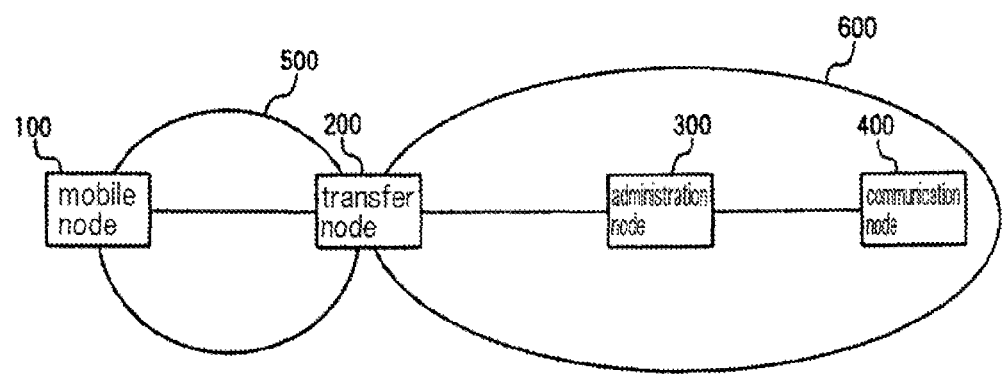
FIG. 1 is a block diagram showing an example of the configuration of a mobile communication system according to a first exemplary embodiment.

EXPLANATION OF REFERENCE 100 mobile node
200, 200' transfer nodes
300 administration server
201, 201', 305 communication sections
202, 202', 310 control sections
205, 205', 325 storage sections
220, 220' registration request processing means
240, 240' registration reply processing means
500 access network
600 core network

BEST MODE FOR CARRYING OUT THE INVENTION (First Exemplary Embodiment)

The configuration of a mobile communication system according to the exemplary embodiment will be described. FIG. 1 is a block diagram showing an example of the configuration of the mobile communication system according to the exemplary embodiment.

As shown in FIG. 1, the mobile communication system according to the exemplary embodiment includes transfer node 200 and administration server 300. Transfer node 200 is connected to each of access network 500 and core network 600. Mobile node 100 is connected to access network 500. Communication node 400 with which mobile node 100 communicates is connected to core network 600. FIG. 1 shows only one access network. However, a plurality of access networks are provided, and the connection destination network varies in conjunction with movement of mobile node 100.

First, mobile node 100, included in the above-described configuration, will be described. The configuration and operation of mobile node 100 are similar to those of a mobile node defined in the RFC3344. Components of mobile node 100 which relate to the present invention will be described below in detail.

Figure 2:
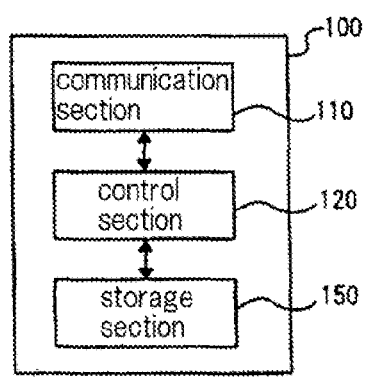
FIG. 2 is a block diagram showing an example of the configuration of a mobile node.

FIG. 2 is a block diagram showing an example of the configuration of the mobile node. As shown in FIG. 2, mobile node 100 includes communication section 110 configured to transmit and receive signals via access network 500, storage section 150, and control section 120 configured to control relevant sections. Control section 120 includes a CPU (Central Processing Unit) (not shown in the drawings) configured to execute processing in accordance with programs, and a memory (not shown in the drawings) configured to store the programs.

Communication section 110 can be connected to and communicate with access network 500 by radio or by wire.

An HoA that is a fixed address regardless of the connection destination network and a CoA that is an address dependent on the connection destination network are registered in storage section 150.

If mobile node 100 needs to change the connection destination to a new access network as a result of migration of mobile node 100, control section 120 transmits a registration request signal requesting registration of the HoA and CoA, to administration server 300. The registration request signal contains not only the HoA and CoA but also the address of administration server 300 and information on the time during which the addresses registered in administration server 300 remain valid. The registration valid period during which the registered information remains valid is hereinafter referred to as Lifetime. When the connection destination access network is to be changed, control section 120 places the HoA and the relevant information in the registration request signal. Other pieces of information may be placed in the registration request signal. The registration request signal is transmitted to administration server 300 via transfer node 200.

Here, the HoA is an address assigned to mobile node 100 itself. The CoA may generally be an address assigned to mobile node 100 itself or an address assigned to transfer node 200 connected to same access network 500. In the exemplary embodiment, the CoA is an address assigned to transfer node 200.

Triggers to transmit the registration request signal to administration server 300 include not only a change of the connection destination access network but also a connection to the access network at the time of activation of mobile node 100 and prevention of expiry of address registration as a result of elapsed time. Thus, the registration request signal may be intended to indicate an address change for registration of a new connection destination access network or to indicate initial address registration or to prevent expiry of address registration.

The registration request signal intended to indicate initial address registration may be transmitted when mobile node 100 moves from outside a communication range into the communication range and then connects to the access network. The registration request signal may contain information indicating whether or not the registration request signal is to be an aggregation target.

Control section 120 may include a signal carrying information indicative of a trigger to transmit the registration request signal, to the transfer node. Here, information indicative of a registration trigger for an initial connection, information indicative of a registration trigger for migration, and information indicative of a trigger for prevention of registration expiry are referred to as initial registration information, migration registration information, and registration information for preventing expiry, respectively. These pieces of information enable transfer node 200 to determine the transmission trigger for the registration request signal more reliably than in the case where transfer node 200 makes determination without the information indicative of the trigger.

When the registration request signal based on the information (initial registration information, migration registration information, and registration information for preventing expiry) indicative of the transmission trigger for the registration request signal is stored, a general transfer node, for example, a general FA, may skip reading of the information indicative of the transmission trigger. The general FA may then execute processing similar to that executed for a registration request signal with no information indicative of the transmission trigger stored therein. Specific examples will be described below.

In the case of MIPv4, in the registration request, the information indicative of the transmission trigger can be stored in extension information that uses one unused type number from among type numbers 128 to 255 as a type number. In this case, a general FA that cannot determine this type in accordance with the specification of the RFC3344 performs an operation of skipping processing associated with the extension information. In another example, the information indicative of the transmission trigger can also be stored using a normal vender/organization specific extension (hereinafter referred to as NVSE) defined in RFC3025. Even with the NVSE, an FA failing to recognize the NVSE performs an operation of neglecting the NVSE and processing the other portions of the registration request signal. Any method other than those described in the specific examples may be used provided that the method allows similar operations to be performed. The information indicative of the transmission trigger may include information indicating whether or not the registration request signal is to be an aggregation target.

Now, transfer node 200 will be described.

Transfer node 200 aggregates registration request signals received from a plurality of mobile nodes 100 to construct an aggregation registration request signal. Transfer node 200 then transmits the aggregation registration request signal to administration server 300. At this time, transfer node 200 determines whether or not registration processing time is important for the received registration request signal as is the case with a registration request signal associated with migration of mobile node 100. Transfer node 200 correspondingly controls the period during which the registration request signals are aggregated. For example, if the registration processing time is important, the aggregation time is sufficiently reduced or the aggregation is avoided. In the exemplary embodiment, in this case, the aggregation is avoided.

On the other hand, if the registration request signal is intended to indicate initial address registration or to prevent expiry of address registration, the time for registration is not so important as in the case where the registration request signal is intended to indicate address change. Thus, if the registration request signal is intended to indicate initial address registration or to prevent expiry of address registration, the aggregation time is increased so as to enhance the effect of a reduction in loads on administration server 300 based on the aggregation.

Furthermore, transfer node 200 inquires of administration server 300 about whether or not the aggregation registration request signal can be processed. Then, only upon determining that the aggregation registration request signal can be processed by administration server 300, transfer node 200 transmits the aggregation registration request signal to administration server 300. Upon determining, that the aggregation registration request signal cannot be processed by administration server 300, transfer node 200 avoids the aggregation and transmits the normal registration request signal to administration server 300. This function allows transfer node 200 according to the present invention to operate in combination with a general administration server with no characteristics of the present invention.

If transfer node 200 receives a registration request signal or an aggregation registration request signal from administration server 300 and, if a code indicative of successful registration is set in the signal, transfer node 200 forms a tunnel with the address of administration server 300 and the address (CoA) of transfer node 300 set to be end points. Transfer node 200 then decapsulates an encapsulated data packet destined for the HoA and transfers the decapsulated data packet to mobile node 100. The operation for tunnel establishment is common and will not be described in detail.

The configuration of transfer node 200 configured to execute the above-described processing will be described in detail.

Figure 3:
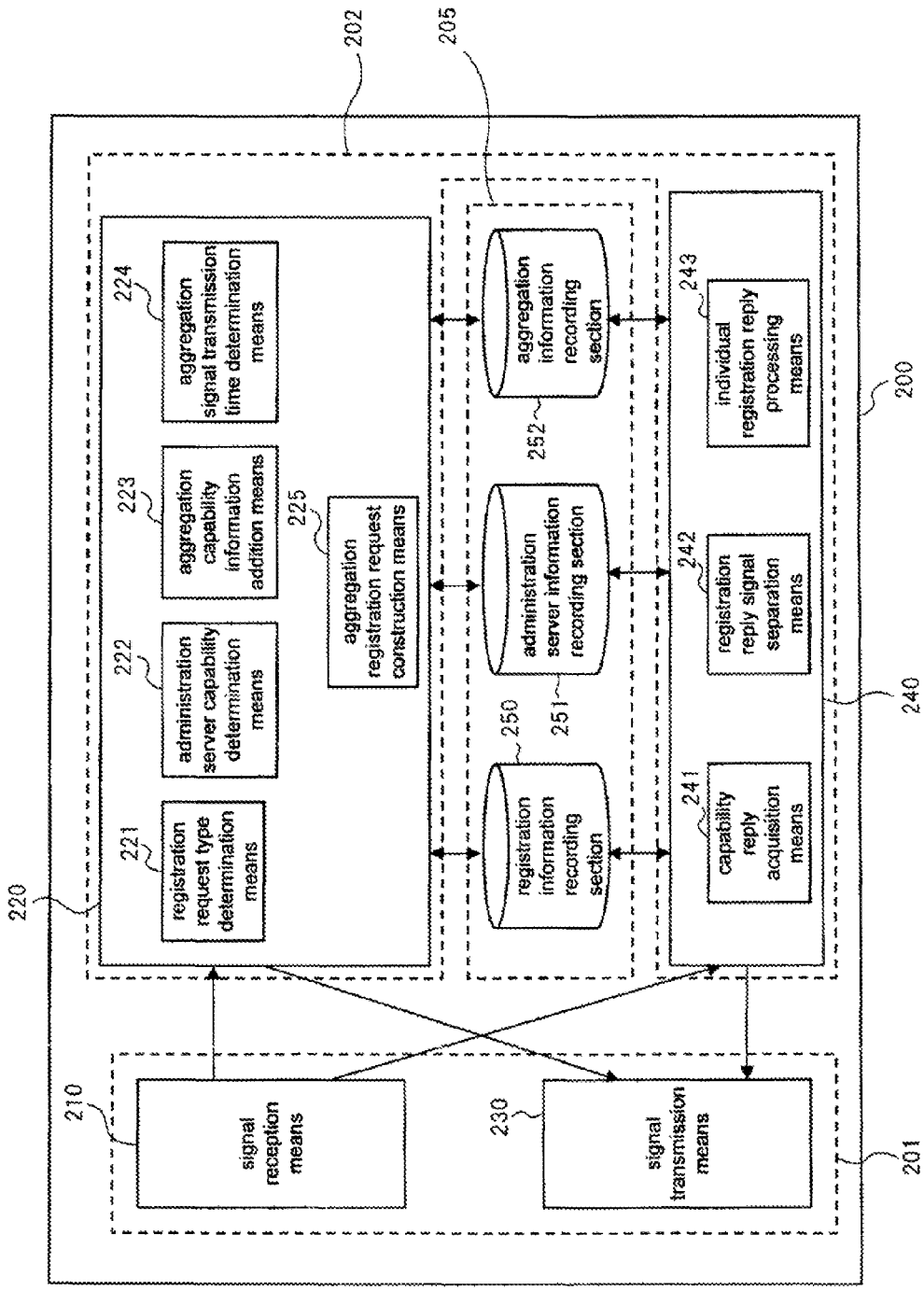
FIG. 3 is a block diagram showing an example of the configuration of a transfer node.

FIG. 3 is a block diagram showing an example of the configuration of the transfer node. As shown in FIG. 3, transfer node 200 includes communication section 201, storage section 205, and control section 202. Control section 202 includes a CPU (not shown in the drawings) configured to execute processing in accordance with programs, and a memory (not shown in the drawings) configured to store the programs.

Communication section 201 includes reception means 210 and transmission means 230. Storage section 205 includes registration information recording section 250, administration server information recording section 251, and aggregation information recording section 252. Control section 202 includes registration request processing means 220, registration reply processing means 240, and data packet processing means (not shown in the drawings). The CPU executes programs to virtually construct registration request processing means 220, registration reply processing means 240, and data packet processing means.

Administration server information recording section 251 includes information recorded therein and indicating whether or not the administration server can process aggregation registration request signals. Registration information recording section 250 includes information recorded therein and relating to the HoA of mobile node 100, and the address and lifetime of administration server 300 that mobile node 100 requests for registration. These pieces of information are hereinafter referred to as registration information. Aggregation information recording section 252 includes information recorded therein and obtained from registration request signals to be aggregated. For example, the registration request signals are aggregated for each point in time when the corresponding aggregation registration request signal is transmitted or for each destination administration server.

Communication section 201 includes interfaces for connection to each of access network 500 and core network 600. Reception means 210 receives data packets from the network via the interface. If the received data packet is a registration request signal, reception means 210 passes the registration request signal to registration request processing means 220. If the received data packet is a registration reply signal transmitted by administration server 300 or an aggregation registration reply signal corresponding to an aggregation of registration reply signals transmitted to plurality of mobile nodes 100 by the administration server, reception means 210 passes the signal to registration reply processing means 240. If the received data packet does not correspond to any of the above-described cases, reception means 210 passes the data packet to the data packet processing means (not shown in the drawings).

Here, the interfaces to access network 500 and core network 600 can be implemented by an NIC (Network Interface Card) and a driver configured to operate the NIC. Furthermore, the data packet processing means executes general packet processing. The general processing includes, for example, a fragment process, a filtering process, a path control process, and a packet transmission and reception process for data packets which are carried out when the CPU executes software programs for TCP (Transmission Control Protocol)/IP. These processes are not related directly to the characteristics of the present invention and will thus not described in detail.

Registration request processing means 220 determines whether or not to aggregate registration request signals received from reception means 210 depending on the type of the registration request signals. Registration request processing means 220 then determines an aggregation period. To aggregate the registration request signals, registration request processing means 220 aggregates a plurality of registration request signals received during the same aggregation period, into an aggregation registration request signal. Registration request processing means 220 then transmits the aggregation registration request signal. Furthermore, registration request processing means 220 notifies a plurality of administration servers that transfer node 200 is capable of aggregating registration request signals. Registration request processing means 220 transmits the aggregation registration request signal only to those of the plurality of administration servers which transmit, in reply to the notification, information indicating that the administration server is capable of processing the aggregation registration request signal.

As shown in FIG. 3, registration request processing means 220 includes registration request type determination means 221, administration server capability determination means 222, aggregation capability information addition means 223, aggregation signal transmission time determination means 224, and aggregation registration request construction means 225.

Registration request type determination means 221 determines whether the registration request signal received from reception means is a registration request signal transmitted at the time of the initial connection of mobile node 100 to the network, or a registration request signal requesting a CoA to be registered which is acquired from a new access network 500 resulting from migration of mobile node 100, or a registration request signal requesting extension of the expiry period in order to prevent expiry of registered information as a result of elapsed time.

Upon determining that the registration request signal is a registration request signal transmitted at the time of the initial connection to the network or a registration request signal intended to have the expiry period extended, registration request type determination means 221 determines the registration request signal to be a candidate for an aggregation target. On the other hand, if the registration request signal is a registration request signal intended to have the new CoA registered which results from a change of the access network connection destination, registration request type determination means 221 avoids aggregating the registration request signal. In the exemplary embodiment, registration request type determination means 221 avoids aggregating the registration request signal associated with network migration. However, the registration request signal may be aggregated during a very short aggregation time. Alternatively, registration request type determination means 221 may avoid aggregation for the initial connection.

Now, the operation of registration request type determination means 221 will be described. It is assumed that, to which of the registration request signals the HoA has been written, is predetermined.

Figure 4:
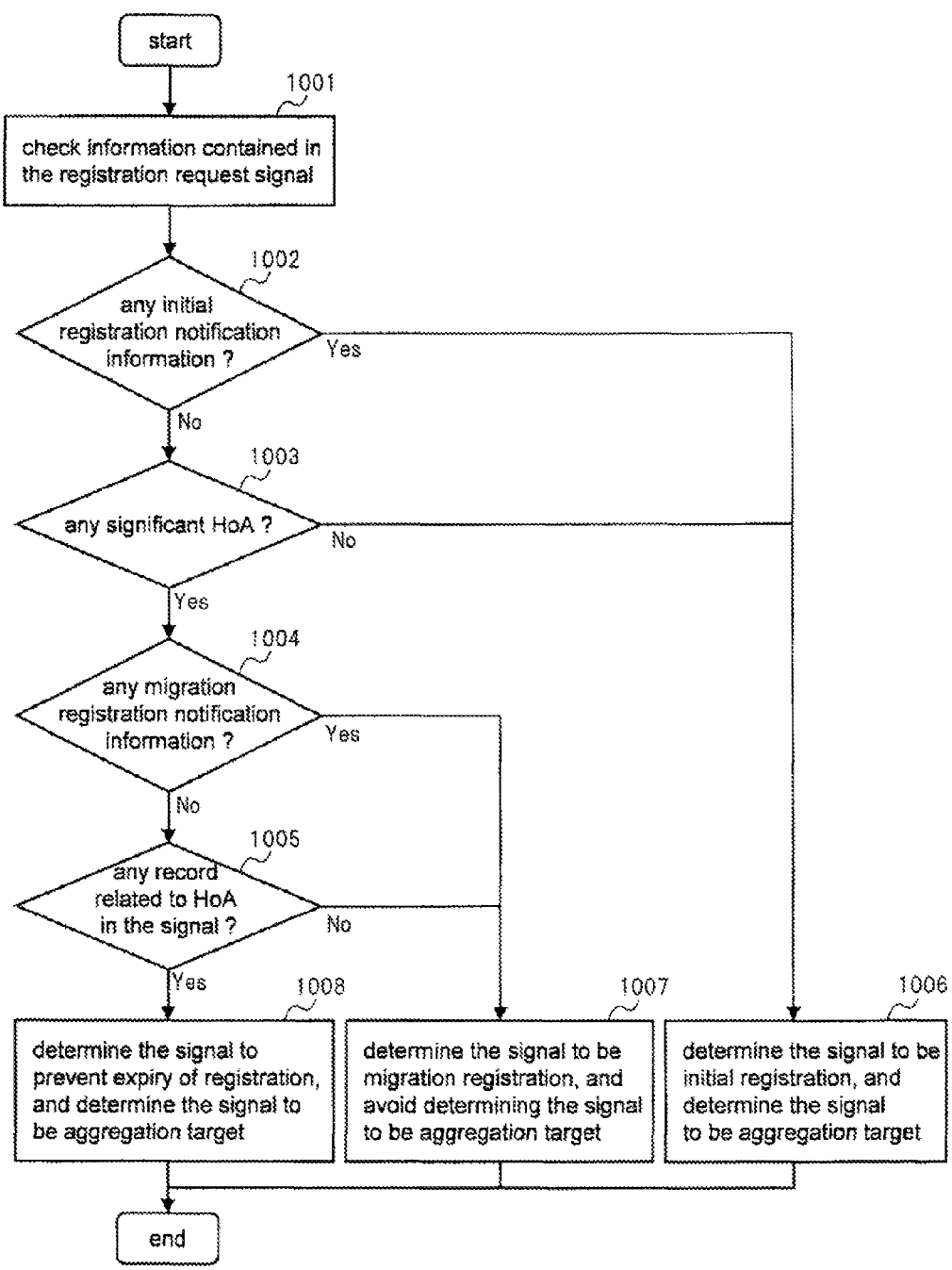
FIG. 4 is a flowchart showing the procedure of operations in which registration request type determination means determines the type of a registration request signal.

FIG. 4 is a flowchart showing an operational procedure in which the registration request type determination means determines the type of the registration request signal. The exemplary embodiment involves three types of registration request signals, that is, an "initial registration" type intended to indicate the initial address registration, a "migration registration" type intended to indicate an address change associated with migration, and a "prevention of registration expiry" type intended to prevent expiry of address registration.

Upon receiving a registration request signal, registration request type determination means 221 examines information contained in the registration request signal (step 1001). Registration request type determination means 221 determines whether or not the registration request signal contains initial registration notification information (step 1002) and whether or nor a significant HoA is described at a predetermined position of the registration request signal (step 1003). The significant HoA is not zero and is such that not all the bits of the HoA are 1.

At least either upon determining in step 1002 that the registration request signal contains no initial registration notification information or upon determining in step 1003 that no significant HoA is set in the registration request signal, registration request type determination means 221 determines the type of the received registration request signal to be the initial registration (step 1006). Registration request type determination means 221 then determines the registration request signal to be a candidate for an aggregation target.

If a significant HoA is set in the registration request signal, registration request type determination means 221 determines whether or not the registration request signal contains migration registration notification information (step 1004) and whether or not the registration request signal contains registration information associated with the set HoA (step 1005).

At least either upon determining in step 1004 that the registration request signal contains migration registration notification information or upon determining in step 1005 that no registration information associated with the HoA has been registered yet, registration request type determination means 221 determines the type of registration request signal to be the migration registration (step 1007). In this case, registration request type determination means 221 avoids determining the registration request signal to be an aggregation target.

On the other hand, if the determination in step 1005 is "Yes", registration request type determination means 221 determines the type of the registration request signal to be the prevention of registration expiry (step 1008). In this case, registration request type determination means 221 determines the registration request signal to be a candidate for an aggregation target.

When the registration request signal for migration registration is not determined to be an aggregation target, administration server 300 can execute an address change process early. This prevents an increase in the amount of time until a registration process associated with migration of the mobile node is completed, thus enabling the possible degradation of communication quality resulting from migration to be avoided. As a result, a disadvantageous possible increase in latency can be prevented.

Upon determining in step 1004 that the registration request signal received from mobile node 100 contains no explicit migration registration notification information, registration request type determination means 221 determines the registration request signal to be of the migration registration type upon determining that registration information recording section 250 contains no registration information (step 1005). In this case, for accurate determinations, when mobile node 100 migrates to a different access network, relevant registration information needs to be removed from the transfer node connected to the last access network connected to mobile node 100 before migration.

Furthermore, the order of the determinations is not limited to that shown in FIG. 4. Moreover, the method for determining the type of the registration request signal as described with reference to FIG. 4 is illustrative and is not limitative.

Registration request type determination means 221 determines the type of the registration request signal as described above, and then passes the registration request signal and the determination result to administration server capability determination means 222.

Upon obtaining the registration request signal and the determination result indicative of the type of the registration request signal, administration server capability determination means 222 reads information on the administration server to which the registration request signal is to be transmitted. Administration server capability determination means 222 determines whether or not the administration server can process aggregation registration request signals.

Figures 5, 6:
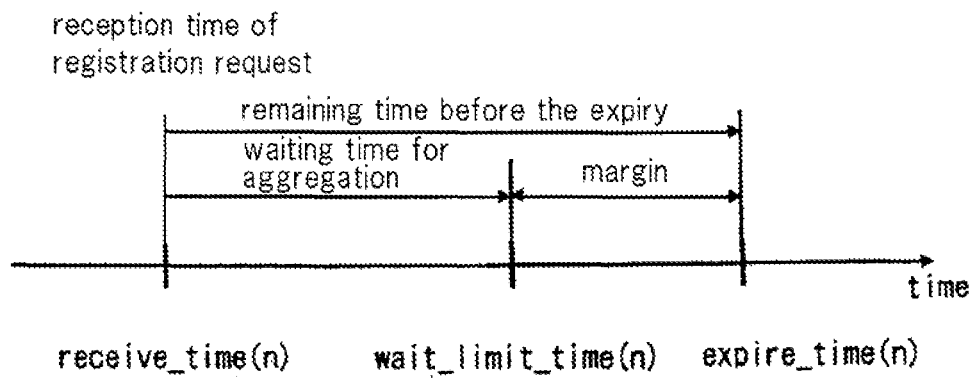
FIG. 5 is a table showing an example of information registered in an administration server information storage section.
FIG. 6 is a diagram illustrating a method of determining an aggregation registration request signal transmission time.

FIG. 5 is a table showing an example of information registered in the administration server information recording section. As shown in FIG. 5, the table contains sets each of the identifier of an administration server and information indicating whether or not the administration server has an aggregation registration request processing capability.

Here, if registration request type determination means 221 determines the type of the registration request signal to be the initial registration or the prevention of registration expiry, that is, to be an aggregation candidate, and if the result of search of the administration server information recording section 251 indicates that the administration server to which the registration request signal is to be transmitted can process aggregation registration request signals, the registration request signal is determined to be aggregated.

On the other hand, if the destination administration server cannot process the aggregation registration request signal, the registration request signal is determined not to be aggregated. Furthermore, if administration server information recording section 251 contains no information on the destination administration server, the registration request signal is determined not to be aggregated. Moreover, aggregation capability addition means 223 described below adds, to the registration request signal, aggregation capability information indicating that transfer node 200 is capable of aggregating registration request signals.

If administration server capability determination means 222 has not yet acquired information which indicates whether or not administration server 300 shown in administration server information recording section 251 to be the destination functions has a capability of processing the aggregation registration request signal, aggregation capability information addition means 223 adds aggregation capability information to the registration request signal. When the aggregation capability information is added to the registration request signal, it is necessary that general administration servers can skip the information and execute processing similar to that for general registration request signals containing none of the information.

Specifically, in the case of the MIPv4, the registration request signal is for a registration request, and the information can be stored as extension information obtained by assigning one unused type number from among type numbers 128 to 255 to the signal. Alternatively, the NVSE may be used or any other method may be used provided that similar effects can be exerted.

Aggregation signal transmission time determination means 224 determines the time when an aggregation registration request signal is transmitted which is obtained by aggregating registration request signals including the registration request signal determined by registration request type determination means 221 and administration server capability determination means 222 to be aggregated.

Now, an example of a method for determining the aggregation registration request signal transmission time will be described. FIG. 6 is a diagram illustrating the method for determining the aggregation registration request signal transmission time. First, aggregation signal transmission time determination means 224 determines, as described below, a limit time wait_limit_time(n) until which the transmission of the registration request signal from a certain mobile node #n (n is any integer equal to or larger than 1) can be withheld.

If the registration request signal is determined to be for initial registration, aggregation signal transmission time determination means 224 adds a preset fixed time to the reception time receive_time(n) of the registration request signal and determines the resultant time to be wait_limit_time(n).

On the other hand, if the registration request signal is intended to prevent expiry of registration, aggregation signal transmission time determination means 224 references the registration information on mobile node #n recorded in registration information recording section 250 to read information expire_time(n). Aggregation signal transmission time determination means 224 subtracts a time for a margin from expire_time(n) to determine the resulting time to be wait_limit_time(n). The time for a margin is assumed to be predetermined. The limit time is determined in this manner.

At this time, wait_limit_time(n) needs to be present between the receive_time(n) and expire_time(n) of the registration request signal. Given that wait_limit_time(n) is simultaneous with or earlier than receive_time(n), the registration request signal is not aggregated.

The above-described method for calculating wait_limit_time(n) is illustrative. Any other method may be used to calculate wait_limit_time(n).

Then, aggregation signal transmission time determination means 224 checks whether or not the wait_limit_time(n) of the registration request signal meets Expression (1) to determine whether or not the registration request signal can be aggregated.

$$T\_aggr(HA) \leq wait\_limit\_time(n) \qquad \text{Expression (1)}$$

T_aggr(HA) in Expression (1) denotes the time when the aggregation registration request signal is transmitted to the administration server 300 for which the next registration request is destined. Aggregation signal transmission time determination means 224 administers this time for each administration server.

If wait_limit_time(n) meets Expression (1), the registration request signal is finally determined to be an aggregation target. Aggregation signal transmission time determination means 224 then determines a transmission time for an aggregation registration request signal containing the registration request signal. On the other hand, if wait_limit_time(n) fails to meet Expression (1), the registration request signal is transmitted without being aggregated.

Aggregation signal transmission time determination means 224 determines T_aggr(HA) shown in Expression (1), in accordance with Expression (2).

$$T\_aggr(HA) = \text{First}\_T\_aggr(HA) + aggr\_window \qquad \text{Expression (2)}$$

First_T_aggr(HA) shown in Expression (2) denotes the reception time of the first received registration request signal from among the registration request signals withheld from transmission so as to allow an aggregation registration request signal to be constructed. Aggregation signal transmission time determination means 224 also administers this time for each administration server. Furthermore, aggr_window denotes the aggregation time determined by presetting or the like. The information on the aggregation time is registered in aggregation information recording section 252.

Now, a specific example of a method for determining whether or not the registration request signal can be aggregated will be described. FIG. 7 illustrates a method for determining whether or not registration request signals from a plurality of mobile nodes can be aggregated.

Here, for simplification of description, it is assumed that three mobile nodes with identification numbers #1 to #3 are present. Furthermore, it is assumed that the destination administration server for each registration request signal can process aggregation registration request signals. Additionally, it is assumed that registration information on each mobile node has already been recorded in registration information recording section 250.

According to the above-described method, for mobile node #1, aggregation signal transmission time determination means 224 calculates wait_limit_time(1) based on expire_time(1) in the registration information. According to the above-described method, for mobile node #2, aggregation signal transmission time determination means 224 calculates wait_limit_time(2) based on expire_time(2) in the registration information. According to the above-described method, for mobile node #3, aggregation signal transmission time determination means 224 calculates wait_limit_time(3) based on expire_time(3) in the registration information.

Immediately after activation of transfer node 200 or transmission of the aggregation registration request signal, no registration request signal is withheld from transmission in order to allow an aggregation registration request signal to be constructed. In this state, when transfer node 200 receives a registration request signal from mobile node #1 at time Ta as shown in FIG. 7, First_T_aggr(HA)=Ta as shown in Expression (2). In FIG. 7, as described above, it is assumed that registration information on each mobile node has already been obtained and that the aggregation registration request signal has just been transmitted.

After determining T_aggr(HA), aggregation signal transmission time determination means 224 determines whether or not the registration request signal is to be aggregated, for each of mobile nodes #1, #2, and #3 in accordance with Expression (1). Based on Expression 1, the registration request signals from mobile nodes #1 and #2 are determined to be aggregation targets, and the registration request signal from mobile node #3 is determined not to be an aggregation target.

Thus, when the time reaches T_aggr(HA), an aggregation registration request signal is transmitted which is obtained by aggregating the registration request signals from mobile nodes #1 and #2. On the other hand, the registration request signal from mobile node #3, determined not to be an aggregation target, is transmitted without being aggregated.

Aggregation signal transmission time determination means 224 records, in aggregation information recording section 252, information contained in registration request signals finally determined to be aggregation targets and for which the transmission time for an aggregation registration request signal has been determined. When recorded in the aggregation information table in aggregation information recording section 252, the information in the registration request signals is classified by the time when the aggregation registration request signal is to be transmitted and by the administration server to which the aggregation registration request signal is to be transmitted. The information classified by the transmission time and the destination administration server is a unit forming an aggregation registration request signal.

FIG. 7 shows that mobile nodes #1 and #2 are aggregation targets. Here, for both nodes, the type of the registration request signal is assumed to be the prevention of registration expiry. Then, since the limit time for mobile node #1 is earlier than that for mobile node #2, a time earlier than the limit time for the mobile node #1 needs to be set to be a transmission time for an aggregation registration request signal. This is to prevent expiry of the registration for the mobile node #1. Thus, if any of the registration request signals is intended to prevent expiry of registration, a time earlier than the earliest end point of the registration valid periods for the registration request signals is set to be a transmission time for an aggregation registration request signal. This prevents expiry of registration of already registered mobile nodes, and enables a plurality of registration request signals to be aggregated.

When information in registration request signals received from a plurality of mobile nodes is recorded in the aggregation information table, plural pieces of the same information in the respective registration request signals may be merged into one in order to allow recording capacity to be efficiently used.

FIG. 8 is a diagram showing an example of the aggregation information table registered in the aggregation information recording section.

As shown in FIG. 8, in the aggregation information table, the first section, located at the leftmost position, is divided into aggregation registration request signal transmission times T_aggr(1) and T_aggr(2). The second section is divided into units in accordance with the identifier of the administration server to which the aggregation registration request signal is to be transmitted. Common information common to at least two registration request signals is described in the third section. The number of registration request signals aggregated is described in the fourth section. Individual information varying among the mobile nodes is described in the final section. The common information and the individual information correspond to information elements contained in the registration request signal. In this manner, pieces of information that can be aggregated are merged into the table.

In FIG. 8, the common information is expressed as COMMON_INFO#n. COMMON_INFO#n includes, for example, at least information on the CoA but may include any other information. Here, (n) denotes an integer equal to or larger than 1, but unlike "n" of mobile node #n, identifies the common information.

On the other hand, individual information is expressed as MN_INDIVIDUAL_INFO#n. (n) of MN_INDIVIDUAL_INFO#n may be the same as "n" of mobile node #n. MN_INDIVIDUAL_INFO#n includes at least one of, for example, the HoA, an NAI (Network Access Identifier: the identifier of the MN), the lifetime, and authentication information depending on the purpose of communication. MN_INDIVIDUAL_INFO#n may include any other information.

In the case shown in FIG. 8, at transmission time T_aggr (1), the aggregation registration request signal is transmitted to each of administration servers HA_addr1 and HA_addr2. At transmission time T_aggr(2), the aggregation registration request signal is transmitted to administration servers HA_addr3. The table in FIG. 8 shows only the cases of transmission times T_aggr(1) and T_aggr(2). However, as time elapses, the information on aggregation registration request signals to be transmitted at transmission times T_aggr (3), T_aggr(4), . . . is written to the aggregation information table.

Aggregation registration request construction means 225 references the aggregation information table recorded in aggregation information recording section 252. Aggregation registration request construction means 225 monitors the time when the aggregation registration request signal is to be transmitted. Then, at the time when the aggregation registration request signal is to be transmitted, aggregation registration request construction means 225 uses the information in the aggregation information table to generate an aggregation registration request signal. Aggregation registration request construction means 225 then passes the aggregation registration request signal to signal transmission means 230.

When the individual information (MN_INDIVIDUAL_INFO#n) to be aggregated includes authentication information, aggregation registration request construction means 225 inserts the authentication information into the aggregation registration request signal. In this case, administration server 300 receiving the aggregation registration request signal can execute an authentication process on each registration request.

On the other hand, upon acquiring, from administration server 300, key information required to execute the authentication process for determining whether or not a signal transmitted between mobile node 100 and administration server 300 has been altered, transfer node 200 may execute the authentication process instead of administration server 300. In this case, the authentication information need not necessarily be stored in the aggregation registration request signal. In an example of a method in which transfer node 200 receives the key information, the key information is stored in a registration reply signal transmitted to the transfer node 200 by administration server 300. However, any other method may be used.

If an aggregation registration reply signal corresponding to the aggregation registration request signal cannot be received even a predetermined time after the transmission of the aggregation registration request signal or if a code set in the aggregation registration request and indicating the result of processing for a registration request is indicative of an error, transfer node 200 uses the information in the aggregation information table to generate and transmit an aggregation registration request signal.

Signal transmission means 230 of communication section 201 transmits the registration request signal or aggregation registration reply signal output by registration request processing means 220 to administration server 300 via core network 600 and the interface. Furthermore, signal transmission means 230 transmits the aggregation registration reply signal output by registration reply processing means 240 to mobile node 100 via access network 500 and the interface.

Registration reply processing means 240 receives the registration reply signal or aggregation registration reply signal transmitted by the administration server 300. Registration reply processing means 240 includes capability reply acquisition means 241, registration reply signal separation means 242, and individual registration reply processing means 243.

Upon receiving a registration reply signal from signal reception means 210, capability reply acquisition means 241 checks whether or not the signal contains aggregation registration request processing capability information indicating that administration server 300 having transmitted the registration reply signal can process aggregation registration request signals. If the registration reply signal contains aggregation registration request processing capability information, capability reply acquisition means 241 records, in administration server information recording section 251, information indicating that administration server 300 having transmitted the registration reply signal can process aggregation registration request signals.

If capability reply acquisition means 241 receives a registration reply signal from administration server 300 to which aggregation capability information addition means 223 has transmitted a registration request signal containing aggregation capability information and if the registration reply signal contains no aggregation registration request processing capability information, capability reply acquisition means 241 records information indicating that administration server 300 having transmitted the registration reply signal cannot process the aggregation registration request signal.

Here, capability reply acquisition means 241 determines that administration server 300 can process aggregation registration request signals based on the aggregation registration request processing capability information. However, administration server 300 may include, in the aggregation registration request processing capability information, information indicating whether or not to permit transfer node 200 to transmit an aggregation registration request signal. In this case, upon acquiring the aggregation registration request processing capability information from administration server 300, transfer node 200 recognizes that administration server 300 has the aggregation registration request processing capability. Transfer node 200 can further determine whether or not administration server 300 has permitted transfer node 200 to execute an aggregation process.

If a signal externally input to signal reception means 210 is an aggregation registration reply signal, registration reply signal separation means 242 reconstructs individual registration reply signals from information elements contained in the aggregation registration reply signal. The reconstruction of the aggregated registration reply signal into the individual registration reply signals enables registration reply signal to be returned to each of plurality of mobile nodes 100. On the other hand, if the signal externally input to signal reception means 210 is a registration reply signal, registration reply signal separation means 242 executes no processing because the signal can be transferred directly to mobile nodes 100.

Individual registration reply processing means 243 processes the externally received registration reply signal or the registration reply signal reconstructed by registration reply signal separation means 242, as described below, in the same manner as that in which general registration reply signals are processed. Individual registration reply processing means 243 determines that the registration process for the received registration reply signal has been successfully carried out by administration server 300. Individual registration reply processing means 243 removes the information in the registration request signal corresponding to the registration reply signal, from aggregation information recording section 252. Individual registration reply processing means 243 then transfers the registration reply signal to mobile node 100 via signal transmission means 230.

On the other hand, individual registration reply processing means 243 references aggregation information recording section 252. If any item of information in the registration request signal remains recorded even after a predetermined time has elapsed, individual registration reply processing means 243 determines that the registration process has failed. Individual registration reply processing means 243 then instructs aggregation registration request construction means 225 to prepare for retransmission of the registration request signal.

In this manner, the registration request signal having failed in the registration request is retransmitted to administration server 300. Furthermore, if any of the registration requests in the aggregated registration request signal has failed and retransmission thus needs to be carried out, only the failed registration request signals are aggregated into an aggregation registration request signal. In this case, loads on the network can be reduced. The reason is as follows. If any aggregation registration request signal contains at least one registration request signal having failed in the registration process, the aggregation registration request signal may be reconstructed and transmitted without removing the information in the registration request signal having failed in the registration process. However, in this case, the retransmitted aggregation registration request signal contains the information in registration request signals having succeeded in the registration process. This increases loads on the network and is thus disadvantageous in terms of network utilization efficiency.

If the type of the registration request signal is the initial registration or the migration registration and a code indicating that the "registration has succeeded" is set in the corresponding registration reply signal, then at a timing when transfer node 200 receives the registration reply signal, a tunnel with the address of administration server 300 and the address (CoA) of transfer node 200 set to be end points thereof is established for mobile node 100. As a result, mobile node 100 and communication node 400 can start or resume communication using the HoA.

Now, administration server 300 will be described.

Administration server 300 executes a general process of processing a registration request signal received from transfer node 200, recording the HoA and CoA of mobile node 100 in association with each other, and then transmitting a registration reply signal to transfer node 200. Thus, a data packet destined for the HoA is transmitted to transfer node 200 via the tunnel and finally reaches the destination of mobile node 100.

Upon receiving an aggregation registration reply signal, administration server 300 according to the exemplary embodiment separates the aggregation registration reply signal into individual general registration request signals. Furthermore, in reply to an aggregation registration reply signal, administration server 300 generates an aggregation registration reply signal corresponding to an aggregated registration request signal and obtained by aggregating replies. Administration server 300 then transmits the aggregation registration reply signal to transfer node 200. Moreover, when a registration request signal received from transfer node 200 contains aggregation capability information, administration server 300 stores aggregation registration request processing capability information in the registration reply signal.

Figure 9:
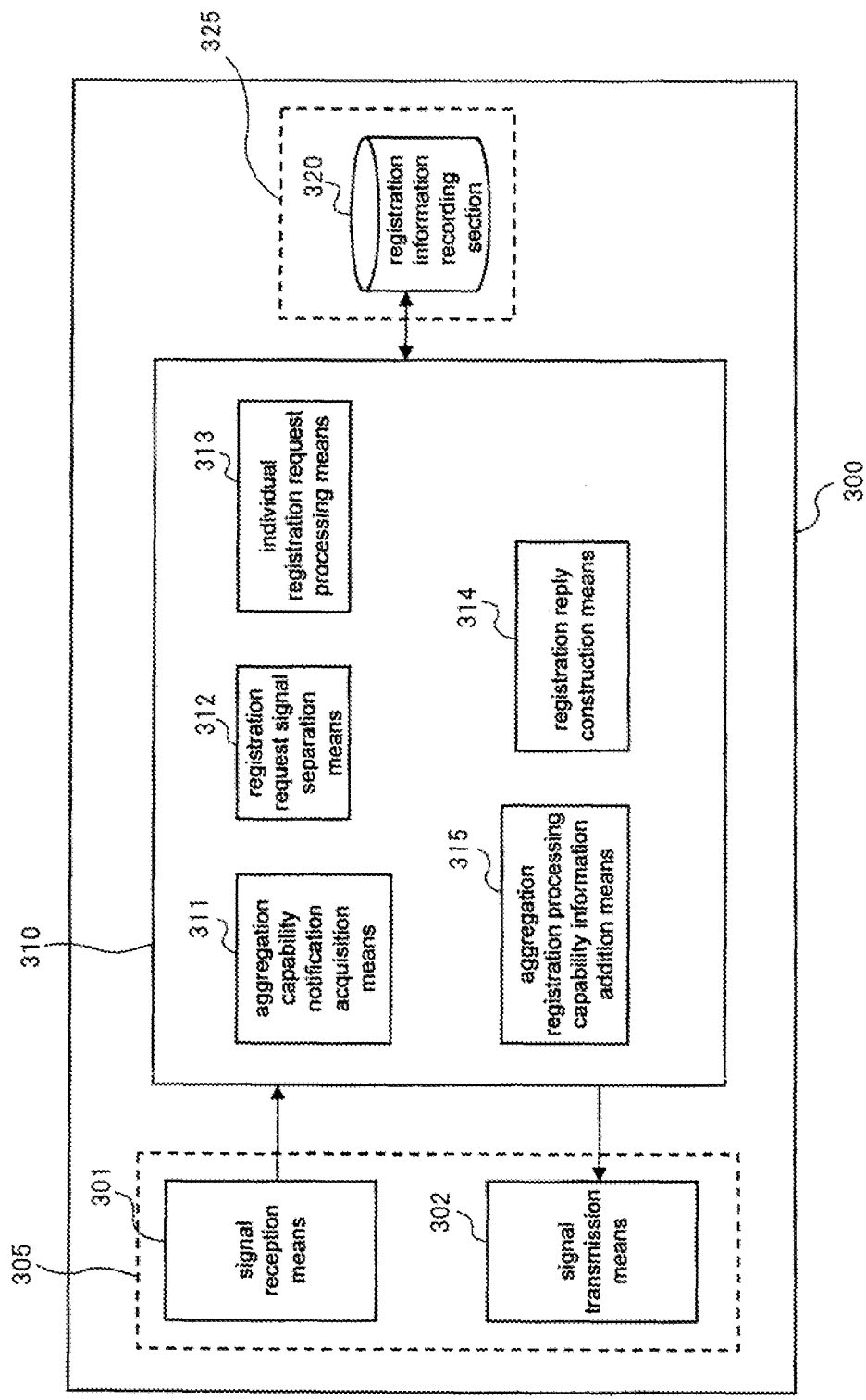
FIG. 9 is a block diagram showing an example of the configuration of an administration server according to the first exemplary embodiment.

The configuration of administration server 300 configured to execute the above-described processing will be described in detail. FIG. 9 is a block diagram showing an example of the configuration of the administration server according to the exemplary embodiment.

As shown in FIG. 9, administration server 300 includes communication section 305, storage section 325, control section 310 serving as registration request processing means. Communication section 305 includes signal reception means 301 and signal transmission means 302.

Signal reception means 301 receives a data packet from the interface connected to core network 600. If the data packet is a registration request signal or aggregation registration request signal transmitted by transfer node 200, signal reception means 301 outputs the signal to control section 310.

Signal transmission means 302 transmits a registration reply signal or aggregation registration reply signal input by control section 310, to transfer node 200 via the interface connected to core network 600.

Storage section 325 includes registration information recording section 320. Registration information recording section 320 is a recording device in which the association between the HoA and CoA of mobile node 100 stored in the registration request signal is recorded. Furthermore, not only the information on the association between the HoA and CoA but also other pieces of information contained in the registration request signal are stored in registration information recording section 320.

Now, control section 310 will be described.

Control section 310 executes a general process of recording the HoA and CoA contained in the registration request signal, in registration information recording section 320 in association with each other. Furthermore, control section 310 executes a process of processing an aggregation registration request signal, and transmitting an aggregation registration reply signal corresponding to the aggregation registration request signal, to transfer node 200. Moreover, to notify transfer node 200 that the aggregation registration request signal can be processed, control section 310 adds aggregation registration request processing capability information to a registration reply signal.

As shown in FIG. 9, control section 310 includes aggregation capability notification acquisition means 311, registration request signal separation means 312, individual registration request processing means 313, registration reply construction means 314, and aggregation registration processing capability information addition means 315. Furthermore, control section 310 includes a CPU (not shown in the drawings) configured to execute processing in accordance with programs and a memory (not shown in the drawings) configured to store the programs. When the CPU executes the programs, the following are virtually constructed in the administration server: aggregation capability notification acquisition means 311, registration request signal separation means 312, individual registration request processing means 313, registration reply construction means 314, and aggregation registration processing capability information addition means 315.

Aggregation capability notification acquisition means 311 determines whether or not the registration request signal or aggregation registration request signal received from signal reception means 301 contains aggregation capability information.

Registration request signal separation means 312 separates the aggregation registration request signal into individual registration request signals on which the aggregation registration request signal is based. Here, registration request signals similar to those which are not subjected to an aggregation process are reconstructed. Thus, if authentication information is applied which is used to check whether or not the registration request signal has been altered between mobile node 100 and administration server 300, administration server 300 can correctly execute an authentication process.

Individual registration request processing means 313 executes a registration process using the registration request signal received from signal reception means 301 or the registration request signal reconstructed by registration request signal separation means 312. This registration process is similar to that executed by general administration nodes and will thus not be described in detail. This process allows information such as the HoA and CoA contained in the registration request signal to be recorded in registration information recording section 320.

Furthermore, when the registration request signal or aggregation registration request signal contains authentication information, individual registration request processing means 313 identifies the mobile node 100 having transmitted the authentication information. Individual registration request processing means 313 then records key information corresponding to the authentication information, in the registration information, on the mobile node. The key information may be pre-acquired from the mobile node or calculated by control section 310 using information on a public key.

Registration reply construction means 314 constructs a registration reply signal corresponding to a reply with the result of the registration request signal processed by individual registration request processing means 313. At this time, if registration request signal separation means 313 has separated the aggregation registration request process, registration reply construction means 314 constructs an aggregation registration reply signal by aggregating information indicative of the results of registration processes corresponding to the aggregated registration request signals. If the process of separating the aggregation registration request signal has not been executed, registration reply construction means 314 constructs a normal registration reply signal.

Registration reply construction means 314 may place, in the registration reply signal, key information shared by mobile node 100 and administration server 300 to execute an authentication process. In this case, instead of administration server 300, transfer node 200 can use the key information for the registration request signal received from mobile node 100 to authenticate the mobile node 100.

Aggregation registration processing capability information addition means 315 adds aggregation registration request processing capability information to the registration reply signal or aggregation registration reply signal constructed by registration reply construction means 314.

Now, the installation of communication node 400, access network 500, and core network 600 shown in FIG. 1 and of the devices shown in FIG. 1 will be described.

Communication node 400 is a general information processing apparatus capable of communicating using the IP. Access network 500 is utilized by mobile node 100 to connect to another node or a server. In general, communication node 400 and access network 500 use a radio technique.

In the exemplary embodiment, core network 600 is administered by the operator of the mobile communication system. Administration server 300 is provided in core network 600. On the other hand, transfer node 200 is generally provided between access network 500 and core network 600. Core network 600 need not necessarily be administered by the operator.

The above-described installation sites of access network 500, core network 600, mobile node 100, administration server 300, and transfer node 200 are only illustrative. For example, all of these nodes and servers may be provided in one network.

Figure 10:
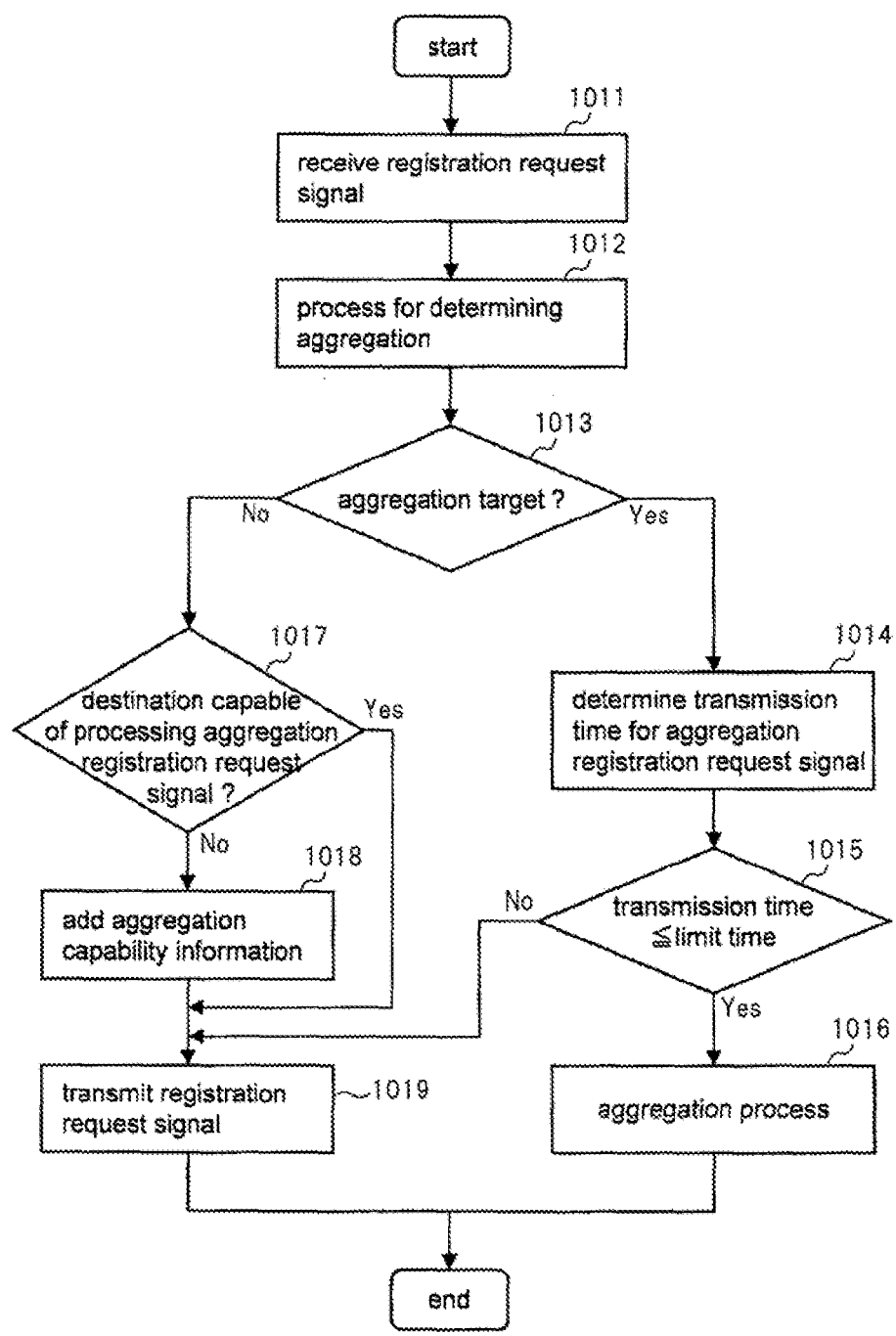
FIG. 10 is a flowchart showing the procedure of operations performed by the transfer node upon receiving the registration request signal.

Now, operations performed by transfer node 200 upon receiving a registration request signal from mobile node 100 will be described below in detail. FIG. 10 is a flowchart showing the procedure of the operations performed by the transfer node upon receiving a registration request signal from the mobile node.

Upon receiving the registration request signal (step 1011), transfer node 200 determines whether or not to aggregate the registration request signal as follows (step 1012). Transfer node 200 determines whether the registration request signal corresponds to the initial registration, the prevention of registration expiry, or the migration registration. The procedure shown in FIG. 4 is applied to the determination of the type of the registration request signal. Furthermore, transfer node 200 references the information recorded in administration server information recording section 251 to determine whether or not administration server 300 to which the registration request signal is to be transmitted can process aggregation registration request signals. Based on the determination results, transfer node 200 finally determines whether or not to aggregate the registration request signal (step 1013).

If administration server 300 to which the registration request signal is to be transmitted can process aggregation registration request signals and if the type of the registration request signal is the initial registration or the prevention of registration expiry, transfer node 200 determines the registration request signal to be an aggregation target. If the type of the registration request signal is the migration registration regardless of whether or not administration server 300 can process aggregation registration request signals, or if administration server 300 cannot process aggregation registration request signals and if the type of the registration request signal is the initial registration or the prevention of registration expiry, transfer node 200 determines the registration request signal not to be an aggregation target.

In step 1013, upon determining the registration request signal to be an aggregation target, transfer node 200 proceeds to processing in step 1014. Upon determining the registration request signal not to be an aggregation target, transfer node 200 proceeds to processing in step 1017.

In step 1014, transfer node 200 uses the method described with reference to FIG. 7 to calculate a limit time for the registration request signal, thus determining a transmission time for an aggregation registration request signal. Subsequently, if the determined transmission time is simultaneous with or earlier than the limit time for the registration request signal (step 1015), transfer node 200 executes an aggregation process of, for example, recording the information contained in the registration request signal, in aggregation information recording section 252 (step 1016). The subsequent transmission of the aggregation registration request signal will be described below.

On the other hand, in step 1017, transfer node 200 determines whether or not administration server 300 to which the registration request signal is to be transmitted can process aggregation registration request signals. In step 1013, the information recorded in administration server information recording section 251 has already been referenced. Thus, transfer node 200 determines whether or not administration server 300 is capable of processing aggregation registration request signals without the need to access administration server information recording section 251. In step 1013, transfer node 200 may temporarily record the information read from administration server information recording section 251, in a fast-readable memory.

Upon determining in step 1017 whether or not administration server 300 can process the aggregation registration request signal, transfer node 200 adds aggregation capability information to the registration request signal (step 1018). Transfer node 200 transmits the registration request signal to administration server 300 (step 1019). In step 1017, upon failing to determine whether or not administration server 300 can process aggregation registration request signals or upon determining that administration server 300 is incapable of processing aggregation registration request signals, transfer node 200 transmits the registration request signal directly to administration server 300 (step 1019).

Furthermore, in step 1015, if the determined transmission time is later than the limit time for the registration request signal, transfer node 200 excludes the registration request signal from the aggregation targets, and then transmits the registration request signal to administration server 300 (step 1019).

The determination condition in step 1013 is only illustrative, and a different condition may be used in step 1013. For example, if the type of the registration request signal is the initial registration, transfer node 200 may avoid determining the registration request signal to be an aggregation target. The exemplary embodiment uses the determination condition described in FIG. 10.

Now, operations performed by transfer node 200 to transmit an aggregation registration request signal to administration server 300 will be described below in detail.

Figure 11:
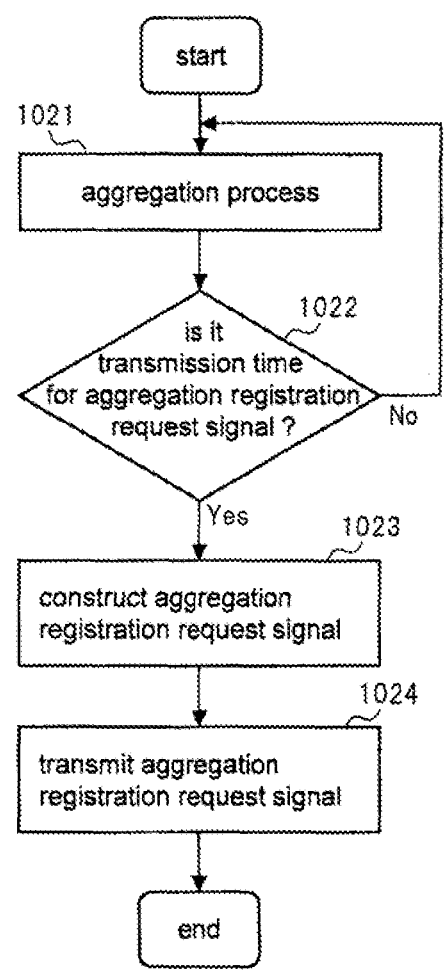
FIG. 11 is a flowchart showing the procedure of operations performed by the transfer node to transmit an aggregation registration request signal.

FIG. 11 is a flowchart showing the procedure of operations performed by the transfer node to transmit an aggregation registration request signal.

As described with reference to FIG. 10, upon every reception of a registration request signal, transfer node 200 determines whether or not to aggregate the registration request signal. If the registration request signal is to be aggregated, transfer node 200 executes an aggregation process on the registration request signal (step 1021). Transfer node 200 determines whether or not the current time is the transmission time for the aggregation registration request signal (step 1022). The information on the transmission time is acquired from the aggregation information table recorded in aggregation information recording section 252.

In step 1022, if the current time is the transmission time for the aggregation registration request signal, transfer node 200 constructs an aggregation registration request signal based on the information recorded in the aggregation information table in aggregation information recording section 252 (step 1023). Subsequently, transfer node 200 transmits the constructed aggregation registration request signal to the destination (step 1024). On the other hand, in step 1022, if the current time has not reached the transmission time for the aggregation registration request signal, transfer node 200 returns to step 1021 to continue the aggregation process on aggregation target registration request signals.

Now, operations performed by transfer node 200 upon receiving a registration reply signal or an aggregation registration reply signal from administration server 300 will be described below in detail.

Figure 12:
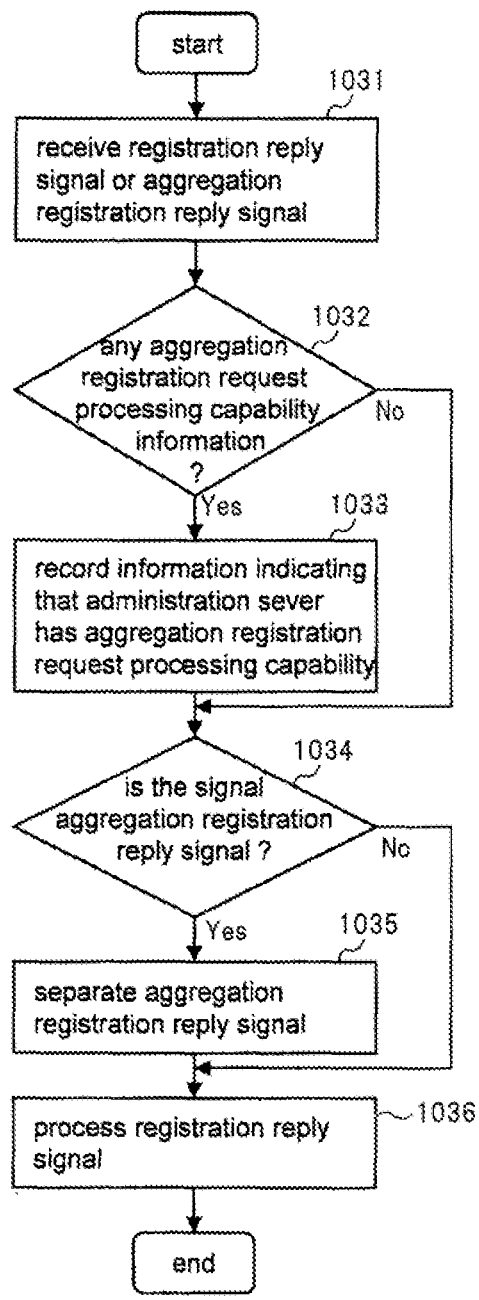
FIG. 12 is a flowchart showing the procedure of operations performed by the transfer node upon receiving the registration reply signal or aggregation registration reply signal.

FIG. 12 is a flowchart showing the procedure of operations performed by the transfer node upon receiving a registration reply signal or an aggregation registration reply signal.

Upon receiving a registration reply signal or an aggregation registration reply signal from administration server 300 (step 1031), transfer node 200 checks whether or not the signal contains aggregation registration request processing capability information (step 1032). If the signal contains aggregation registration request processing capability information, transfer node 200 records information indicating that administration server 300 has the aggregation registration request processing capability, in administration server information recording section 251 (step 1033). Transfer node 200 proceeds to step 1034. If the received signal contains no aggregation registration request processing capability information, transfer node 200 executes no processing and proceeds to step 1034.

In step 1034, transfer node 200 determines whether or not the received signal is an aggregation registration reply signal. If the result of the determination indicates that the received signal is an aggregation registration reply signal, transfer node 200 separates the aggregation registration reply signal into individual registration reply signals (step 1035). Transfer node 200 then executes a predetermined process on each of the registration reply signals (step 1036). If the result of the determination in step 1034 indicates that the received signal is a registration reply signal, transfer node 200 proceeds to step 1036. After step 1036, the registration reply signal is transmitted to mobile node 100 by transfer node 200.

If the type of the registration request signal is the initial registration or the migration registration and a code meaning that the "registration has succeeded" is set in the corresponding registration reply signal, then when transfer node 200 receives the registration reply signal from administration server 300, a tunnel for mobile node 100 is established between administration server 300 and transfer node 200. As a result, mobile node 100 and communication node 400 can start or resume communication using the HoA.

Now, operations performed by administration server 300 upon receiving a registration request signal or an aggregation registration request from transfer node 200 will be described below in detail. Here, it is assumed that administration server 300 has the aggregation registration request processing capability.

Figure 13:
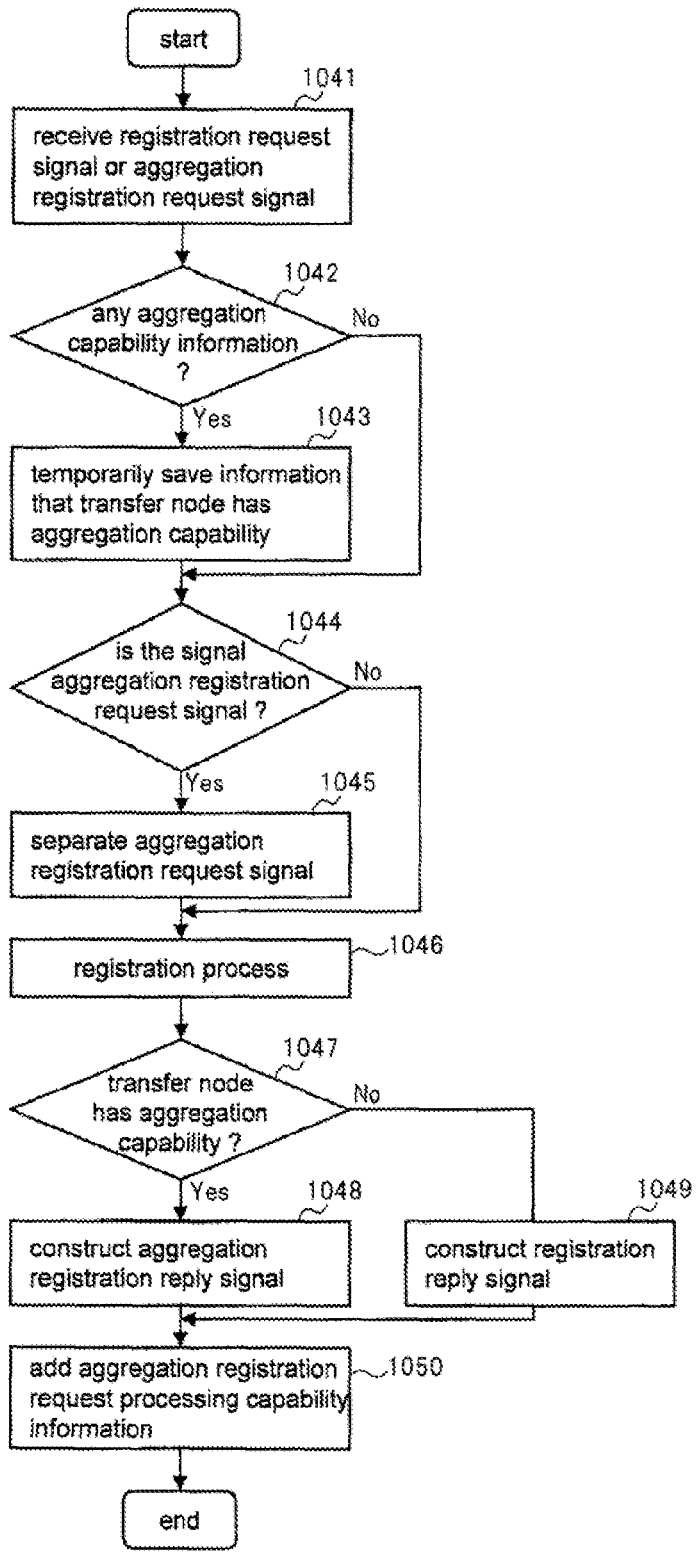
FIG. 13 is a flowchart showing the procedure of operations performed by the administration server upon receiving the registration request signal or aggregation registration request signal.

FIG. 13 is a flowchart showing the procedure of operations performed by administration server 300 upon receiving a registration request signal or an aggregation registration request.

Upon receiving a registration request signal or an aggregation registration request signal from transfer node 200 (step 1041), administration server 300 checks whether or not the signal contains aggregation capability information (step 1042). If the signal contains aggregation capability information, administration server 300 temporarily saves information indicating that transfer node 200 has the aggregation capability (step 1043), and then proceeds to step 1044. If the received signal contains no aggregation capability information, administration server 300 executes no processing and proceeds to step 1044.

In step 1044, administration server 300 determines whether or not the received signal is an aggregation registration request signal. If the result of the determination indicates that the received signal is an aggregation registration request signal, administration server 300 separates the aggregation registration request signal into individual registration request signals (step 1045). Administration server 300 executes registration processes in accordance with the respective registration request signals (step 1046). Thus, registration information required to associate the HoA and CoA of mobile node 100 with each other is recorded in registration information recording section 320. If the result of the determination in step 1044 indicates that the received signal is a registration request signal, administration server 300 proceeds to step 1046.

Subsequently, to determine whether or not transfer node 200 has the aggregation capability, administration server 300 determines whether or not the corresponding information is temporarily saved and whether or not any aggregation registration request signal has been received (step 1047). If at least one of the two determination results is "Yes", administration server 300 recognizes that transfer node 200 has the aggregation capability, and then proceeds to step 1048. If both of the determination results are "No", administration server 300 proceeds to step 1049.

In step 1049, administration server 300 constructs a registration reply signal corresponding to a reply with the result of the registration process. In step 1048, administration server 300 aggregates registration reply signals into an aggregation registration reply signal. Administration server 300 then adds the aggregation registration request processing capability information to the signal constructed in step 1048 and 1049 (step 1050). Thereafter, the registration reply signal or the aggregation registration reply signal is transmitted to transfer node 200.

Now, operations performed in the mobile communication system according to the exemplary embodiment in reply to a registration request from the mobile node will be described.

Here, it is assumed that mobile node 100 is initially connected to access network 500 dominated by transfer node 200. Furthermore, transfer node 200 is assumed to have the aggregation capability, but not to hold information indicating whether or not administration server 300 can process aggregation registration request signals. Administration server 300 is assumed to be capable of processing aggregation registration request signals.

Figure 14:
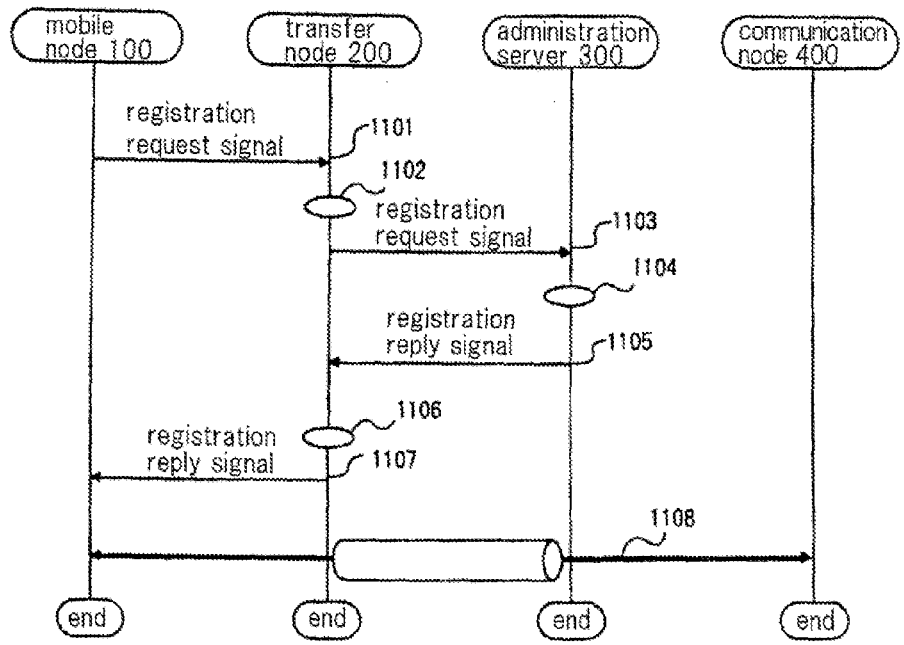
FIG. 14 is a sequence diagram showing the procedure of operations in the mobile communication system according to the first exemplary embodiment.

FIG. 14 is a sequence diagram showing an example of the procedure of operations performed in the mobile communication system according to the exemplary embodiment.

Upon being connected to access network 500 dominated by transfer node 200, transfer node 200 detects that transfer node 200 has been connected to access network 500, and transmits a registration request signal intended for initial registration, to administration server 300 (step 1101). Any method may be used to detect a connection to access network 500. For example, if transfer node 200 is an FA specified in the RFC3344, an AA (Agent Advertisement) transmitted to mobile node 100 by transfer node 200 serves as a trigger to transmit the registration request signal.

Upon receiving the registration request signal from mobile node 100, transfer node 200 executes processing in accordance with the procedure shown in FIG. 10 (step 1102). Here, transfer node 200 holds no information indicating whether or not administration server 300 can process aggregation registration request signals. Thus, transfer node 200 avoids aggregating the registration request signal, and adds aggregation capability information to the registration request signal. Transfer node 200 then transmits the registration request signal to administration server 300 (step 1103).

Upon receiving the registration request signal from transfer node 200, administration server 300 executes processing in accordance with the procedure shown in FIG. 13. Here, the registration request signal avoids being aggregated after the detection of the aggregation capability information. Thus, the registration request signal is processed in a general manner. Then, the correspondence relationship between the HoA and CoA is recorded in registration information recording section 320. A process of capsulating data packets destined for the HoA is also started. Thereafter, administration server 300 adds aggregation registration request processing capability information to a registration reply signal, and then transmits the registration reply signal to mobile node 100 (step 1105).

Upon receiving the registration reply signal from administration server 300, transfer node 200 executes processing in accordance with the procedure shown in FIG. 12 (step 1106). In step 1106, transfer node 200 detects the aggregation registration request processing capability information in the registration reply signal. Transfer node 200 then records information indicating that administration server 300 can process aggregation registration request signals, in administration server information recording section 251. Then, transfer node 200 processes the registration reply signal in a general manner, and records registration information for mobile node 100 such as expiry time in registration information recording section 250. The reception of the registration reply signal from administration server 300 allows transfer node 200 to recognize that the process of registering mobile node 100 has been succeeded. Then, transfer node 200 decapsulates an encapsulated data packet received from administration server 300 and destined for the CoA, and starts preparing for a process of transmitting the taken-out data packet destined for the HoA. Transfer node 200 then transmits a registration request reply signal to mobile node 100 (step 1107).

When mobile node 100 receives the registration reply signal, data packets can be transmitted between mobile node 100 and communication node 400 via the tunnel between transfer node 200 and administration server 300 (step 1108).

Operations performed in the mobile communication system according to the exemplary embodiment in reply to registration requests from a plurality of mobile nodes will be described below.

Here, it is assumed that two mobile nodes 100a and 100b transmit registration request signals intended to prevent expiry of registration. Each of two mobile nodes 100a and 100b is assumed to request administration server 300 to register the mobile node. Transfer node 200 is assumed to have the aggregation capability and to already hold information indicating that administration server 300 can process aggregation registration requests.

Figure 15:
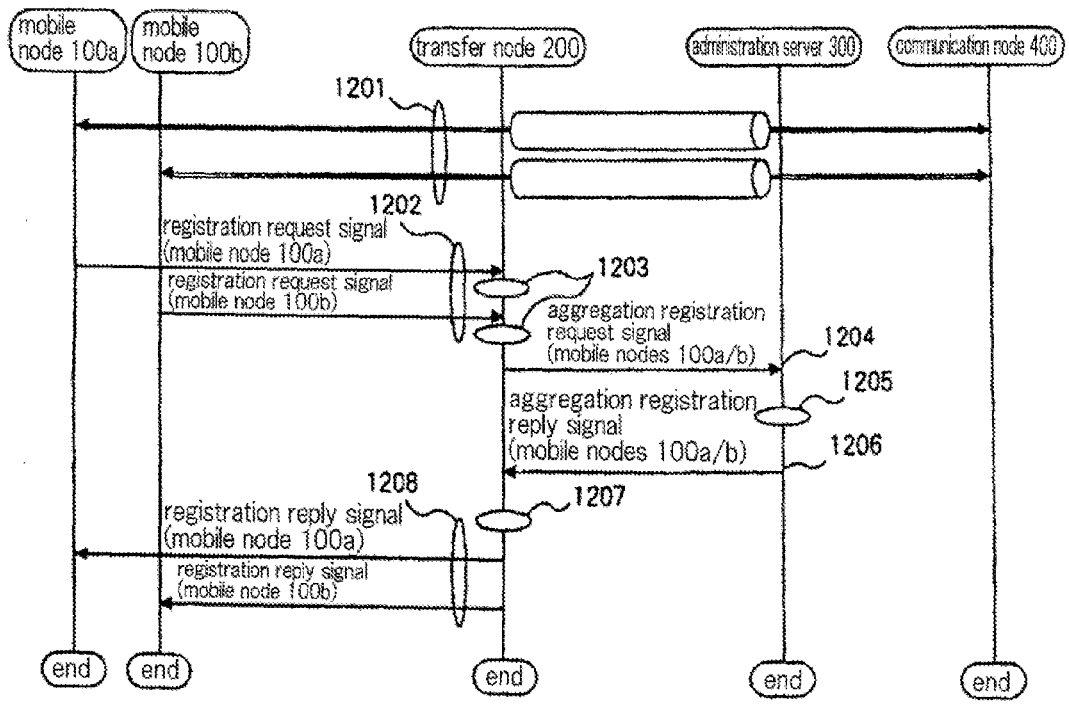
FIG. 15 is a sequence diagram showing the procedure of operations in the mobile communication system according to the first exemplary embodiment.

FIG. 15 is a sequence diagram showing an example of the procedure of operations performed in the mobile communication system according to the exemplary embodiment.

Each of mobile nodes 100a and 100b has already completed registering the HoA and CoA and can thus communicate with communication node 400 (step 1201). Time elapses from the completion of the registration, and triggered by the nearing expiry time of registration, each of mobile nodes 100a and 100b transmits a registration request signal for preventing expiry of registration to administration server 300 (step 1202). The nearing expiry time of registration can be recognized by prerecording information on the registration valid period and by measuring the time from the reception of a registration reply signal.

Upon receiving a registration request signal from each of mobile nodes 100a and 100b, transfer node 200 executes processing in accordance with the procedure shown in FIG. 10 (step 1203). Here, transfer node 200 holds information indicating that administration server 300 can process aggregation registration request signals and thus determines to aggregate the registration request signals from mobile nodes 100a and 100b. Then, transfer node 200 uses the method described with reference to FIG. 7 to determine a transmission time for an aggregation registration request signal. As a result, transfer node 200 determines the two registration request signals to be targets for the same aggregation period.

When the transmission time for the aggregation registration request signal is defined as T_addr(1), transfer node 200 waits for the current time to reach transmission time T_Addr(1) in accordance with the procedure shown in FIG. 11. When the current time reaches T_addr(1), transfer node 200 transmits the aggregation registration request signal obtained by aggregating the registration request signals from mobile nodes 100a and 100b, to administration server 300 (step 1204).

Upon receiving the aggregation registration request signal from transfer node 200, administration server 300 executes processing in accordance with the procedure shown in FIG. 13 (step 1205). Here, administration server 300 separates the aggregation registration request signal into the individual registration request signals, and then executes a registration process on each of the registration request signals. As a result, the expiry time in the registration information on mobile nodes 100a and 100b is postponed. Here, if the aggregation registration request signal contains authentication information for the individual registration request signals, administration server 300 executes an authentication process on each of the registration request signals before postponing the registration expiry time. Thereafter, administration server 300 transmits an aggregation registration reply signal to transfer node 200 (step 1206). Furthermore, administration server 300 may identify the mobile node based on the authentication information, and then use key information to execute an authentication process on the registration request signal received from the identified mobile node.

Upon receiving the aggregation registration reply signal from administration server 300, transfer node 200 executes processing in accordance with the procedure shown in FIG. 12 (step 1207). Here, transfer node 200 separates the aggregation registration reply signal into individual registration reply signals, and then processes each of the registration reply signals. At this time, transfer node 200 postpones the registration expiry time in the registration information held in registration information recording section 250. Transfer node 200 transmits the individually constructed registration reply signals to mobile nodes 100a and 100b, respectively (step 1208).

In the present embodiment, the transfer node aggregates registration request signals transmitted by a plurality of mobile nodes into one aggregation registration request signal, and transmits the aggregation registration request signal to the administration server. Thus, the administration server can process the plurality of registration request signals at one time by processing the aggregation registration request, signal. This reduces the load involved in processing of the registration request signals compared to the case where every single received registration request signal is processed at each time.

Furthermore, the transfer node notifies the administration server of aggregation capability information indicating that the transfer node is capable of transmitting aggregation registration request signals. Furthermore, the transfer node transmits the aggregation registration request signal only to the administration server having transmitted a registration reply signal containing aggregation registration request signal processing capability information indicating that the administration server is capable of processing aggregation registration request signals. Thus, a transfer node with the aggregation capability and an administration server without the aggregation registration request processing capability can communicate with each other. In this case, no aggregation registration request signal is used, and general registration request signals and registration reply signals are transmitted.

Furthermore, the administration server returns an aggregation registration reply signal only to the transfer node having transmitted an aggregation registration request signal. Thus, a transfer node without the aggregation capability and an administration server with the aggregation registration request processing capability can communicate with each other. Also in this case, no aggregation registration request signal is used, and general registration request signals and registration reply signals are transmitted.

Furthermore, if the registration request signal contains authentication information used to determine whether or not the registration request signal has been altered during transmission from the mobile node to the administration server, the transfer node places the authentication information in the aggregation registration request signal. The transfer node places, in the aggregation registration request signal, not only the authentication information but also all of the information required to reconstruct the individual registration request signals from the aggregation registration request signal. Thus, the administration server can reconstruct the individual registration request signals from the aggregation registration request signal and then execute an authentication process on each individual registration request signal. In this manner, the administration server can itself execute the authentication process without the need for the transfer node to acquire key information required to execute the authentication process from the administration server and to execute the authentication process instead of the administration server. Here, if the registration request signal has been altered between the mobile node and the transfer node, the administration server can detect the alteration.

Above-described mobile node 100, transfer node 200, and administration server 300 may be considered to be an MN, an FA, and an HA, respectively, specified in the RFC3344. Alternatively, mobile node 100 may be considered to be a PMIPv4 client specified in WiMAXForum. The PMIPv4 does not migrate between networks like normal mobile nodes. However, when notified, through the operation of the system, of a CoA in a network to which the mobile node migrates, the PMIPv4 transmits a registration request signal to the FA corresponding to the transfer node and receives a registration reply signal from the FA, instead of the mobile node. Thus, the PMIPv4 client may be considered to be an immobile MN.

Furthermore, the registration request signal and the registration reply signal may be considered to a registration request and a registration reply, respectively, specified in the RFC3343.

Moreover, the communication system according to the present invention is applicable to a system configured such that a node corresponding to transfer node 200 transfers a signal requesting registration of the association between an address fixedly used and an address varying with the network, to a node corresponding to administration server 300, and transfers a reply to the signal to the node corresponding to mobile node 100. Furthermore, the transfer node and server apparatus according to the present invention are applicable to the nodes in the system configured as described above. The program according to the present invention is applicable to a program controlling the nodes in the system configured as described above.

Second Exemplary Embodiment

In the first exemplary embodiment, the mobile node is a start point that transmits a registration request signal, and the transfer node transfers the registration request signal. In a second exemplary embodiment, the transfer node itself generates and transmits a registration request signal. Specifically, this corresponds to the case of PMIPv6. In the PMIPv6, a MAG serves as a transfer node, and an LMA (Local Mobility Anchor) may be considered to be an administration server.

In the second exemplary embodiment, components similar to those of the first exemplary embodiment are denoted by the same reference numerals and will not be described in detail. A mobile communication system according to the second exemplary embodiment will be described with reference to FIG. 1.

Unlike mobile node 100 according to the first exemplary embodiment, a mobile node according to the second exemplary embodiment avoids transmitting no explicit registration request signal required to associate an HoA with a CoA. The mobile node according to the second exemplary embodiment transmits signals handled by general IP terminals and not explicitly intended to register the association between the HoA and CoA unlike in the case of RS (Router Solicitation) and DHCP (Dynamic Host Configuration Protocol) Discovery and Request. However, the signal handled by the IP terminal may contain information on an initial connection to a network or migration between networks.

The following signals are referred to as mobile node connection signals: RS and DHCP Discovery and Request signals or the like, or a signal enabling detection of a connection of mobile node 100' to access network 500, such as a signal indicating an established radio connection, or a signal enabling detection of migration of the mobile node 100' to a different destination network.

The mobile node according to the second exemplary embodiment includes no configuration or operation relating directly to the characteristics of the present invention. Thus, the detailed description of the mobile node is omitted.

Figure 16:
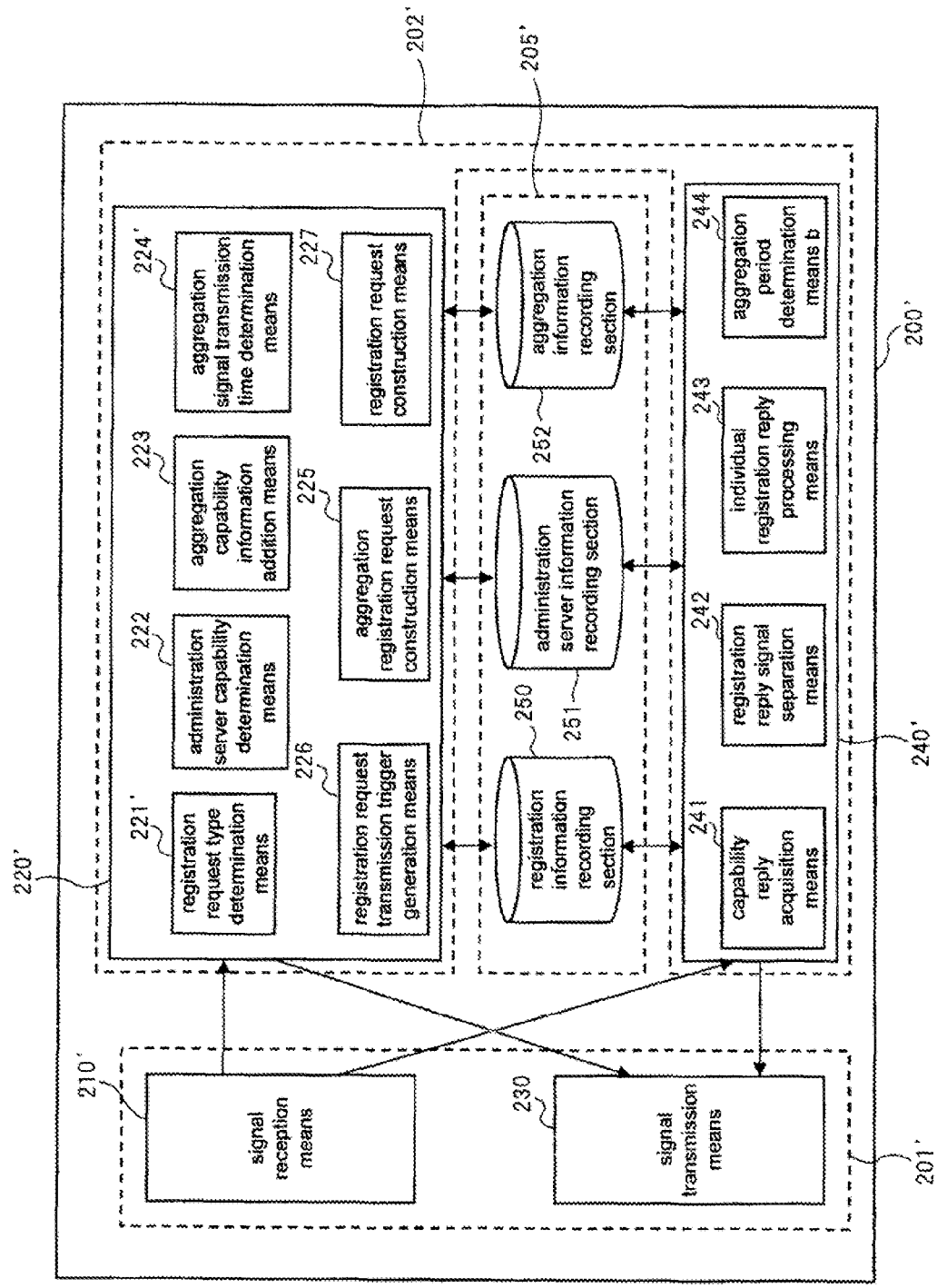
FIG. 16 is a block diagram showing an example of the configuration of a transfer node according to a second exemplary embodiment.

Now, a transfer node according to the second exemplary embodiment will be described. FIG. 16 is a block diagram showing an example of the configuration of the transfer node according to the second exemplary embodiment.

Transfer node 200' itself generates a registration request signal as a trigger which is an exchange:a signal handled by general IP terminals to the mobile node, and the signal being not explicitly intended to register the association between the HoA and CoA such as RS and DHCP Discovery and Request, or as a trigger which is a detection of a radio connection by the mobile node. Transfer node 200' transmits the generated registration request signal to administration server 300.

As shown in FIG. 16, registration request processing means 220' of transfer node 200' includes not only the components of registration request processing means 220 according to the first exemplary embodiment but also registration request transmission trigger generation means 226 and registration request construction means 227. Furthermore, the operation of registration request type determination means 221' and aggregation signal transmission time determination means 224' is partly different from that in the first exemplary embodiment. Thus, in the second exemplary embodiment, the description of components common to both exemplary embodiments is omitted, and differences from the first exemplary embodiment will be described in detail. This also applies to signal reception means 210' of communication section 201'.

Registration response processing means 240' of transfer node 200' includes not only the components of registration reply processing means 240 but also aggregation period determination means b 244.

Upon receiving a mobile node connection signal from the mobile node, signal reception means 210' outputs the signal to registration request processing means 220'.

Registration request transmission trigger generation means 226 is triggered by the reception of the mobile node connection signal to output a registration request trigger signal urging transmission of a registration request signal, to registration request type determination means 221'. Furthermore, based on an expiry time in registration information recorded in registration information recording section 250, registration request transmission trigger generation means 226 calculates the time when a registration request signal intended to postpone the expiry time is to be transmitted. Moreover, when the time to transmit the registration request signal is reached, registration request transmission trigger generation means 226 transmits the registration request trigger signal to registration request type determination means 221'.

The registration request trigger signal transmitted by registration request transmission trigger generation means 226 contains information indicating the type of a registration request trigger such as an initial connection of the mobile node to the network, a connection following migration from a different network, or postponement of the registration expiry time. These types are hereinafter referred to as "initial registration", "migration registration", and "prevention of registration expiry", respectively.

As described below, if transfer node 200' administers the prevention of registration expiry, the types of the registration request trigger need not include the prevention of registration expiry. Furthermore, the registration request trigger signal is a kind of signal that triggers transmission of the registration request signal.

Means for determining whether the registration request signal is the initial registration or the migration registration may be means used in general mobile communication systems. For example, it is possible to communicate with a transfer node or another node belonging to a network connected to the mobile node before migration to determine whether or not the mobile node has migrated from the different network. Registration request transmission trigger generation means 226 utilizes information obtained from another node to determine the type of the registration request trigger signal. Registration request transmission trigger generation means 226 then stores information on the determined type in the registration request trigger signal.

A signal used by registration request type determination means 221' to determine the type of the registration request signal is different from that used by registration request type determination means 221 according to the first exemplary embodiment. Registration request type determination means 221 according to the first exemplary embodiment carries out type determination on the registration request signal received from the mobile node 100. However, registration request type determination means 221' according to the second exemplary embodiment carries out type determination on the registration request trigger signal received from registration request transmission trigger generation means 226.

Aggregation signal transmission time determination means 224' operates similarly to aggregation signal transmission time determination means 224 except that the meaning of First_T_aggr(HA) used to determine T_aggr(HA) in accordance with Expression (2) according to the second exemplary embodiment is different from that according to the first exemplary embodiment. First_Taggr(HA) in the second exemplary embodiment denotes the reception time of the first received signal of the reserved registration request trigger signals to be aggregated.

If the registration request signal is determined to be transmitted without being aggregated, based on the results of determinations made by registration request type determination means 221' and if administration server capability determination means 222 or the target registration request trigger signal is finally excluded from the aggregation targets by aggregation signal transmission time determination means 224', registration request construction means 227 constructs a registration request signal. Registration request construction means 227 transmits the constructed registration request signal to administration server 300.

Also in the second exemplary embodiment, a CPU (not shown in the drawings) provided in control section 202' executes programs to virtually construct the means in the control section, in transfer node 200.

Now, operations performed by transfer node 200' upon receiving a signal triggering transmission of a registration request signal or an aggregation registration request signal, from the mobile node will be described below in detail.

Figure 17:
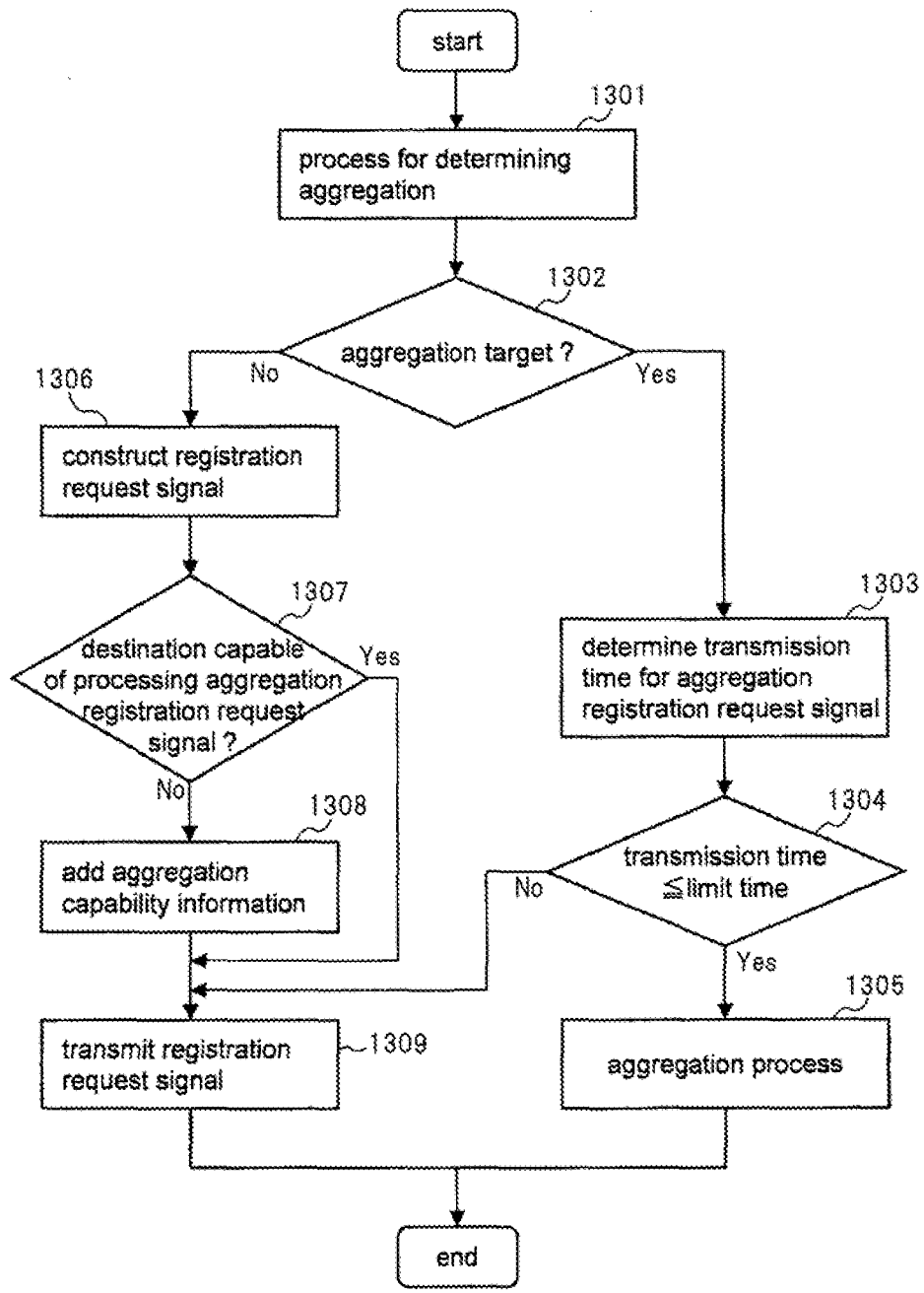
FIG. 17 is a flowchart showing the procedure of operations performed by the transfer node according to the second exemplary embodiment upon receiving a signal serving as a transmission trigger for a registration request signal or an aggregation registration request signal.

FIG. 17 is a flowchart showing the procedure of operations performed by the transfer node upon receiving a signal triggering transmission of a registration request signal or an aggregation registration request signal.

Registration request transmission trigger generation means 226 is triggered by reception of a mobile node connection signal to output a registration request trigger signal to registration request type determination means 221'. Upon receiving the registration request trigger signal from registration request transmission trigger generation means 226, registration request type determination means 221' determines whether or not to aggregate a registration request signal corresponding to the registration request trigger signal (step 1301).

In this determination, whether or not to aggregate the registration request signal is determined based on information indicating whether or not administration server 300 to which the registration request signal is to be transmitted is capable of processing aggregation registration request signals and information indicating whether the registration request trigger signal is a type of the initial registration, the prevention of registration expiry, or the migration registration; these pieces of information are recorded in administration server information recording section 251. Whether or not administration server 300 is capable of processing aggregation registration request signals can be determined with reference to the information recorded in administration server information recording section 251. In the second exemplary embodiment, if the type of the registration request trigger signal is the initial registration or the prevention of registration expiry and if the administration server 300 can process aggregation registration request signals, registration request type determination means 221' determines to aggregate the registration request signal. Otherwise, registration request type determination means 221' avoids aggregating the registration request signal.

The above-described condition for determining whether or not to carry out the aggregation is only illustrative and may be varied. For example, the aggregation may be avoided if the type of the registration request trigger signal is the initial registration.

In step 1302, upon determining the registration request signal to be an aggregation target, transfer node 200' proceeds to processing in step 1303. Upon determining the registration request signal not to be an aggregation target, transfer node 200' proceeds to processing in step 1306.

In step 1303, transfer node 200' calculates a limit time for the registration request signal, and determines a transmission time for an aggregation registration request signal based on the reception time of the first received registration request trigger signal in the same manner as that according to the first exemplary embodiment. Subsequently, if the determined transmission time is simultaneous with or earlier than the limit time for the registration request signal (step 1304), transfer node 200' executes an aggregation process such as recording information contained in the registration request signal, in aggregation information recording section 252 (step 1305). The subsequent transmission process is executed in accordance with the procedure shown in FIG. 11 and described in the first exemplary embodiment.

On the other hand, in step 1302, if the registration request signal is determined not to be an aggregation target, transfer node 200' constructs a registration request signal in accordance with the registration request trigger signal (step 1306). Subsequently, transfer node 200' determines whether or not administration server 300 to which the registration request signal is to be transmitted can process aggregation registration request signals (step 1307). In step 1301, the information recorded in administration server information recording section 251 has already been referenced. Thus, transfer node 200' determines whether or not administration server 300 is capable of processing aggregation registration request signals without the need to access administration server information recording section 251.

Upon determining in step 1307 that administration server 300 is capable of processing aggregation registration request signals, transfer node 200' adds aggregation capability information to the registration request signal (step 1308). Transfer node 200' transmits the registration request signal to administration server 300 (step 1309). In step 1307, upon failing to determine whether or not administration server 300 can process aggregation registration request signals or upon determining that administration server 300 is incapable of processing aggregation registration request signals, transfer node 200' proceeds to step 1309 to transmit the registration request signal directly to administration server 300.

Furthermore, in step 1304, if the determined transmission time is later than the limit time for the registration request signal, transfer node 200' excludes the registration request signal from the aggregation targets, and then transmits the registration request signal to administration server 300 (step 1309).

Figure 18:
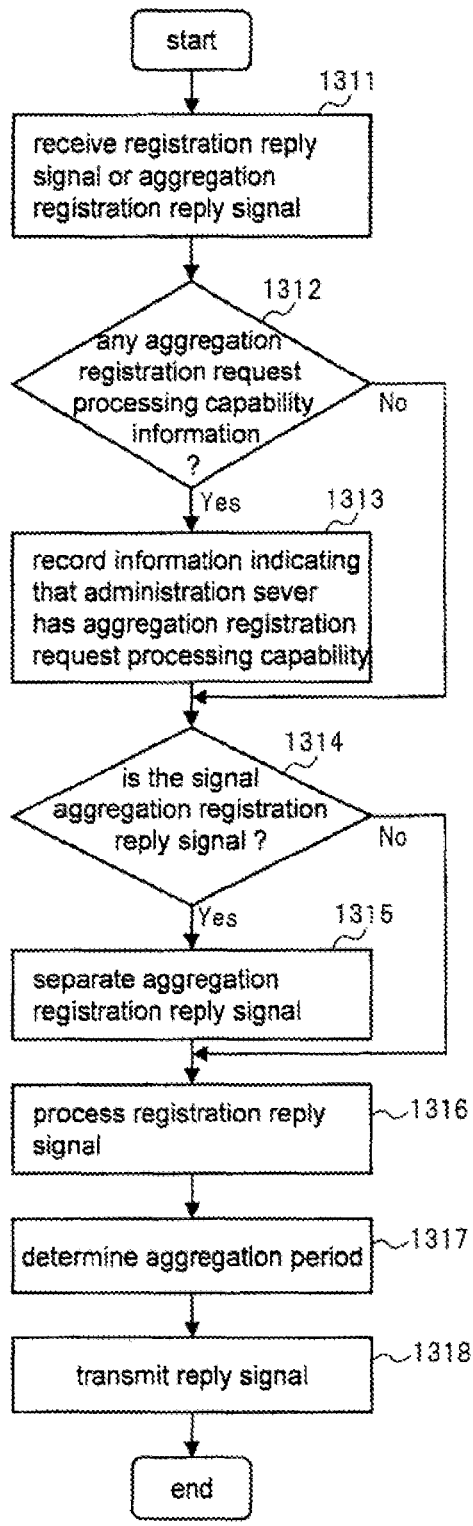
FIG. 18 is a flowchart showing the procedure of operations performed by the transfer node according to the second exemplary embodiment to process the registration request signal or aggregation registration request signal.

Now, operations performed by transfer node 200' upon receiving a registration reply signal or an aggregation registration reply signal will be described. FIG. 18 is a flowchart showing the procedure of operations performed by the transfer node upon receiving a registration reply signal or an aggregation registration reply signal.

Upon receiving a registration reply signal or an aggregation registration reply signal from administration server 300 (step 1311), transfer node 200' checks whether or not the signal contains aggregation registration request processing capability information (step 1312). If the signal contains aggregation registration request processing capability information, transfer node 200' records information indicating that administration server 300 has the aggregation registration request processing capability, in administration server information recording section 251 (step 1313). Transfer node 200' proceeds to step 1314. If the received signal contains no aggregation registration request processing capability information, transfer node 200' executes no processing and proceeds to step 1314.

In step 1314, transfer node 200' determines whether or not the received signal is an aggregation registration reply signal. If the result of the determination indicates that the received signal is an aggregation registration reply signal, transfer node 200' separates the aggregation registration reply signal into individual registration reply signals (step 1315). Transfer node 200' then executes a predetermined process on each of the registration reply signals (step 1316). If the result of the determination in step 1314 indicates that the received signal is a registration reply signal, transfer node 200' proceeds to step 1316.

In step 1316, when a code indicating that administration server 300 has succeeded in the registration process, the registration information contained in the registration reply signal is recorded in registration information recording section 250; the information includes the HoA, the address of administration server 300, and a lifetime, that is, a registration valid time.

If the type of the registration request signal is the initial registration or the migration registration and a code meaning that the "registration has succeeded" is set in the corresponding registration reply signal, then when transfer node 200' receives the registration reply signal from administration server 300, a tunnel for the mobile node is established between administration server 300 and transfer node 200'. As a result, the mobile node and communication node 400 can start or resume communication using the HoA.

Upon recording the registration information in registration information recording section 250 in step 1316, transfer node 200' determines an aggregation period for an aggregation registration request signal based on the lifetime. Transfer node 200' thus determines the next transmission time for the aggregation registration request signal (step 1317). As described with reference to FIG. 6, the transmission time is set to be earlier than the registration expiry time by a margin corresponding to the amount of time expected to be required for the administration server to extend the registration period. Thereafter, transfer node 200' transmits a reply signal corresponding to the signal that triggered the registration request signal (step 1318).

In the second exemplary embodiment, the transfer node aggregates mobile node connection signals transmitted by a plurality of mobile nodes to construct one aggregation registration request signal based on the plurality of mobile node connection signals. The transfer node then transmits the aggregation registration request signal to the administration server. Thus, the administration server can process the plurality of registration request signals at one time by processing the aggregation registration request signal. This reduces the load involved in processing of the registration request signals compared to the case where every single received registration request signal is processed at each time.

Furthermore, the transfer node notifies the administration server of aggregation capability information indicating that the transfer node is capable of transmitting aggregation registration request signals. Furthermore, the transfer node transmits the aggregation registration request signal only to the administration server that transmitted a registration reply signal containing aggregation registration request signal processing capability information indicating that the administration server is capable of processing aggregation registration request signals. Thus, a transfer node with the aggregation capability and an administration server without the aggregation registration request processing capability can communicate with each other.

Furthermore, the second exemplary embodiment exerts other effects similar to those of the first exemplary embodiment. The transfer node according to the present embodiment transmits a registration request signal or an aggregation registration request signal intended to request initial registration and migration registration to the administration server upon being triggered by reception of at least one from among RS and DHCP Discovery and Request signals transmitted by the IP terminal upon being connected to the network. Furthermore, the transfer node references the lifetime information in the held registration information to monitor the registration expiry time. The transfer node is triggered by the current time nearing the registration expiry time, to transmit a registration request signal or an aggregation registration request signal intended to prevent expiry of registration. Instead of the transfer node, the transfer node performs registration and requests the administration server to extend the registration. As a result, the transfer node, providing no function to register the HoA and CoA in association with other, can be provided with mobile communication services.

The transfer node and administration server according to the present embodiment may be considered to be a MAG and an LMA, respectively, specified in the PMIPv6 draft, the specification of which is being formulated by the IETF.

Furthermore, the registration request signal and the registration reply signal may be considered to be PBU (Proxy Binding Update) and PBA (Proxy Binding Acknowledgement), respectively, specified in the PMIPv6 draft.

Moreover, the communication system according to the preset invention is applicable to a system configured such that a node corresponding to transfer node 200' transmits a request for registration of the HoA and CoA in association with each other to a node corresponding to administration server 300 and receives a reply to the request, instead of nodes corresponding to a plurality of mobile nodes 100' connected to transfer node 200' and providing no function to register the HoA and CoA in association with each other. Furthermore, the transfer node and server apparatus according to the present invention are applicable to the nodes in the system configured as described above. In addition, the program according to the present invention is applicable to a program controlling the nodes in the system configured as described above.

In the first and second exemplary embodiments, the means in the control section of each apparatus is virtually constructed by the CPU by executing the corresponding program. However, a part or all of the means may be formed of hardware such as a dedicated circuit.

Access network 500 can preferably be accessed by the mobile node using a radio technique such as WiFi (registered trade mark), WiMAX (registered trade mark), or 3G. However, access network 500 may use a wired technique.

Core network 600 is assumed to be a core network for a mobile telephone network such as 3GPP or 3GPP2 or a CSN (Connectivity Service Network) specified in WiMAXForum. However, core network 600 may be the Internet, an IP network in a particular organization, or any other network.

Industrial Applicability

The present invention is applicable to all mobile communication systems in which a transfer node for relaying a registration request signal for position registration is located between a mobile node transmitting a position registration request and an administration server receiving the position registration request. In particular, the present invention is preferably applicable to a mobile communication system to which the MIPv4 technique or the PMIPv6 is applied. In particular, the present invention is applicable to mobile communication systems standardized in the 3GPP, 3GPP2, or WiMAXForum.

Furthermore, although the names of the nodes and servers vary among the above-described standard-setting organizations, nodes functioning as the HA specified in the RFC 3344 and the LMA described in the PMIPv6 draft are suitable as administration server 300 described in the first and second exemplary embodiment by way of example. Additionally, the FA specified in the RFC3344 is suitable as transfer node 200 described in the first exemplary embodiment by way of example. A node functioning as the MAG described in the PMIPv6 draft is suitable as transfer node 200' described in the second exemplary embodiment by way of example.

By way of example, the present invention exerts the following effect. Every opportunity is taken to aggregate registration request signals by determining whether or not to aggregate the registration request signal depending on the type thereof. This enables a reduction in the number of times the administrating server receives registration request signals, and thus in the load on the server.

As another example, the present invention exerts the following effect. Registration request signals that cannot be aggregated are immediately transmitted to the server. This prevents a disadvantageous increase in latency.

While the invention has been particularly shown and described with reference to exemplary embodiments and examples thereof, the invention is not limited to these embodiments and examples. It will be understood by those of ordinary skill in the art that various changes in form and details may be made therein without departing from the spirit and scope of the present invention as defined by the claims.

The invention claimed is:

1. A communication system comprising a transfer node transmitting a registration request signal for requesting registration of an address of a mobile node and a server receiving the registration request signal from the transfer node,
   wherein when a transmission trigger for the registration request signal occurs, the transfer node determines the type of the transmission trigger, and depending on the determined type, determines whether or not the number of mobile nodes which will be registered or which will have a registration expiry time postponed are a plurality, in accordance with the registration request signal, wherein if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information, and
   wherein upon receiving the registration request signal from the transfer node, the server executes a process of registering the mobile node specified in the registration request signal or of postponing the registration expiry time for the mobile node, and upon receiving the aggregation registration request signal, the server executes a process of registering the specified plurality of mobile nodes or of postponing the registration expiry time for the specified plurality of mobile nodes, and
   wherein upon receiving the registration request signal from the mobile node, the transfer node determines whether or not the registration request signal is to be an aggregation target, depending on the type of the registration request signal, and if a determination result indicates that the registration request signal is not to be an aggregation target, the transfer node transmits the registration request signal to the server, and if the determination result indicates that the registration request signal is to be an aggregation target, the transfer node holds the registration request signal until a predetermined time, aggregates held registration request signals to generate the aggregation registration request signal, and transmits the aggregation registration request signal to the server at the predetermined time.

2. The communication system according to claim 1, wherein the type of the registration request signal includes migration registration intended to request registration for an address change associated with migration and prevention of registration expiry intended to request extension of registration in order to prevent expiry of registration, and
   the transfer node determines the registration request signal to be an aggregation target if the type of the registration request signal is the prevention of registration expiry, and determines the registration request signal not to be an aggregation target if the type of the registration request signal is the migration registration.

3. The communication system according to claim 2, wherein the transfer node pre-holds information on a registration valid period for each mobile node registered in the server, and
   when any of the registration request signals to be aggregated is for the prevention of registration expiry, the transfer node determines a time before the earliest end point of the registration valid period of the registration request signal to be the predetermined time.

4. A communication system comprising a transfer node transmitting a registration request signal for requesting registration of an address of a mobile node and a server receiving the registration request signal from the transfer node,
   wherein when a transmission trigger for the registration request signal occurs, the transfer node determines the type of the transmission trigger, and depending on the determined type, determines whether or not the number of mobile nodes which will be registered or which will have a registration expiry time postponed are a plurality, in accordance with the registration request signal, wherein if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information, and wherein upon receiving the registration request signal from the transfer node, the server executes a process of registering the mobile node specified in the registration request signal or of postponing the registration expiry time for the mobile node, and upon receiving the aggregation registration request signal, the server executes a process of registering the specified plurality of mobile nodes or of postponing the registration expiry time for the specified plurality of mobile nodes, wherein the type of a transmission trigger for the registration request signal includes migration registration intended to request registration for an address change associated with migration and prevention of registration expiry intended to request extension of registration in order to prevent expiry of registration, and if the type of the transmission trigger for the registration request signal is the prevention of registration expiry, the transfer node transmits, to the server, the aggregation registration request signal allowing a plurality of mobile nodes to have the registration expiry time postponed, and if the type of the transmission trigger for the registration request signal is the migration registration, the transfer node transmits, to the server, the aggregation registration request signal avoiding determining a plurality of mobile nodes to be registration targets.

5. A transfer node transmitting a registration request signal for requesting registration of an address of a mobile node, to a server administering the address, the transfer node comprising:

a storage section to save information contained in a transmission trigger for the registration request signal; and a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information, wherein the control section determines whether or not the registration request signal is to be an aggregation target, depending on the type of the registration request signal, and if a determination result indicates that the registration request signal is not to be an aggregation target, the control section transmits the registration request signal to the server, and if the determination result indicates that the registration request signal is to be an aggregation target, the control section holds the registration request signal until a predetermined time, aggregates held registration request signals to generate the aggregation registration request signal, and transmits the aggregation registration request signal to the server at the predetermined time.

6. The transfer node according to claim 5, wherein the type of the registration request signal includes migration registration intended to request registration for an address change associated with migration and prevention of registration expiry intended to request extension of registration in order to prevent expiry of registration, and the control section determines the registration request signal to be an aggregation target if the type of the registration request signal is the prevention of registration expiry, and determines the registration request signal not to be an aggregation target if the type of the registration request signal is the migration registration.

7. The transfer node according to claim 5, wherein the registration request signal contains information indicating whether or not the registration request signal is to be an aggregation target.

8. The transfer node according to claim 6, wherein the control section pre-holds, in the storage section, information on a registration valid period for each mobile node registered in the server, and when any of the registration request signals to be aggregated is for the prevention of registration expiry, the control section determines a time before the earliest end point of the registration valid period of the registration request signal to be the predetermined time.

9. A transfer node transmitting a registration request signal for requesting registration of an address of a mobile node, to a server administering the address, the transfer node comprising:

a storage section to save information contained in a transmission trigger for the registration request signal; and a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information, wherein the type of a transmission trigger for the registration request signal includes migration registration intended to request registration for an address change associated with migration and prevention of registration expiry intended to request extension of registration in order to prevent expiry of registration, and if the type of the transmission trigger for the registration request signal is the prevention of registration expiry, the control section transmits, to the server, the aggregation registration request signal allowing a plurality of mobile nodes to have the registration expiry time postponed, and if the type of the transmission trigger for the registration request signal is the migration registration, the control section transmits, to the server, the aggregation registration request signal avoiding determining a plurality of mobile nodes to be registration targets.

10. A transfer node transmitting a registration request signal for requesting registration of an address of a mobile node, to a server administering the address, the transfer node comprising:
- a storage section to save information contained in a transmission trigger for the registration request signal; and
- a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information,
- wherein upon receiving information which indicates having a capability of processing the aggregation registration request signal, from the server, the control section determines whether or not the registration request signal is to be an aggregation target.

11. A transfer node transmitting a registration request signal for requesting registration of an address of a mobile node, to a server administering the address, the transfer node comprising:
- a storage section to save information contained in a transmission trigger for the registration request signal; and
- a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information,
- wherein before transmitting the aggregation registration request signal to the server, the control section transmits, to the server, aggregation capability information indicating that the transfer node is capable of transmitting the aggregation registration request signal.

12. A transfer node transmitting a registration request signal for requesting registration of an address of a mobile node, to a server administering the address, the transfer node comprising:
- a storage section to save information contained in a transmission trigger for the registration request signal; and
- a control section that when a transmission trigger for the registration request signal occurs, determines the type of the transmission trigger, and depending on the determined type, determines whether or not the number of mobile nodes which will be registered or which will have registration expiry time postponed are a plurality, in accordance with the registration request signal and that if the plurality of mobile nodes are not to be processed, generates and outputs a registration request signal intended for one mobile node, to the server, and if the plurality of mobile nodes are to be processed, generates and transmits, to the server, a piece of information indicating that the plurality of mobile nodes will be processed, or a piece of information indicating the plurality of mobile nodes which will be processed, or an aggregation registration request signal with both pieces of information,
- when any of the registration request signals to be aggregated contains authentication information allowing detection of alteration of a signal transmitted between the mobile node and the server, the control section places the authentication information in the aggregation registration request signal, and transmits the resultant aggregation registration request signal to the server.

13. The transfer node according to claim 12, wherein when the control section receives a registration reply signal notifying the mobile node of a result of a registration process from the server and the registration reply signal contains key information used to calculate the authentication information, the control section stores the key information in the storage section, and thereafter uses the key information to check a signal transmitted between the mobile node and the server for alteration.

14. A communication control method by a transfer node transmitting a registration request signal for requesting registration of an address of a mobile node and a server receiving the registration request signal from the transfer node,
- wherein when a transmission trigger for the registration request signal occurs, the transfer node determines the type of the transmission trigger,
- depending on the determined type, the transfer node determines whether or not the number of mobile nodes which will be registered or which will have registration expiry time postponed are a plurality, in accordance with the registration request signal, and if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information,
- wherein upon receiving the registration request signal from the transfer node, the server executes a process of registering the mobile node specified in the registration request signal or of postponing the registration expiry time, and upon receiving the aggregation registration request signal, the server executes a process of registering the specified plurality of mobile nodes or of postponing the registration expiry time for the specified plurality of mobile nodes, and
- wherein upon receiving the registration request signal from the mobile node, the transfer node determines whether or not the registration request signal is to be an aggregation target, depending on the type of the registration request signal, and if a determination result indicates that the registration request signal is not to be an aggregation target, the transfer node transmits the registration request signal to the server, and if the determination result indicates that the registration request signal is to be an aggregation target, the transfer node holds the registration request signal until a predetermined time, aggregates held registration request signals to generate the aggregation registration request signal, and transmits the aggregation registration request signal to the server at the predetermined time.

15. The communication control method according to claim 14, wherein the type of the registration request signal includes migration registration intended to request registration for an address change associated with migration and prevention of registration expiry intended to request extension of registration in order to prevent expiry of registration, and the transfer node determines the registration request signal to be an aggregation target if the type of the registration request signal is the prevention of registration expiry, and determines the registration request signal not to be an aggregation target if the type of the registration request signal is the migration registration.

16. The communication control method according to claim 15, wherein the transfer node pre-holds information on a registration valid period for each mobile node registered in the server, and when any of the registration request signals to be aggregated is for the prevention of registration expiry, the transfer node determines a time before the earliest end point of the registration valid period of the registration request signal to be the predetermined time.

17. A communication control method by a transfer node transmitting a registration request signal for requesting registration of an address of a mobile node and a server receiving the registration request signal from the transfer node, wherein when a transmission trigger for the registration request signal occurs, the transfer node determines the type of the transmission trigger, depending on the determined type, the transfer node determines whether or not the number of mobile nodes which will be registered or which will have registration expiry time postponed are a plurality, in accordance with the registration request signal, and if the plurality of mobile nodes are not to be processed, the transfer node generates and outputs a registration request signal intended for one mobile node, to the server, and if the plurality of mobile nodes are to be processed, the transfer node generates and transmits, to the server, a piece of information indicating that the plurality of mobile nodes will be processed, or a piece of information indicating the plurality of mobile nodes which will be processed, or an aggregation registration request signal with both pieces of information, wherein upon receiving the registration request signal from the transfer node, the server executes a process of registering the mobile node specified in the registration request signal or of postponing the registration expiry time, and upon receiving the aggregation registration request signal, the server executes a process of registering the specified plurality of mobile nodes or of postponing the registration expiry time for the specified plurality of mobile nodes, and wherein the type of a transmission trigger for the registration request signal includes migration registration intended to request registration for an address change associated with migration and prevention of registration expiry intended to request extension of registration in order to prevent expiry of registration, and if the type of the transmission trigger for the registration request signal is the prevention of registration expiry, the transfer node transmits, to the server, the aggregation registration request signal allowing a plurality of mobile nodes to have the registration expiry time postponed, and if the type of the transmission trigger for the registration request signal is the migration registration, the transfer node transmits, to the server, the aggregation registration request signal avoiding determining a plurality of mobile nodes to be registration targets.

* * * * *